US010158229B2

(12) United States Patent
Gan et al.

(10) Patent No.: US 10,158,229 B2
(45) Date of Patent: Dec. 18, 2018

(54) DISTRIBUTED GRADIENT DESCENT FOR SOLVING OPTIMAL POWER FLOW IN RADIAL NETWORKS

(71) Applicant: California Institute of Technology, Pasadena, CA (US)

(72) Inventors: Lingwen Gan, Sunnyvale, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 266 days.

(21) Appl. No.: 14/818,203

(22) Filed: Aug. 4, 2015

(65) Prior Publication Data

US 2016/0036226 A1 Feb. 4, 2016

Related U.S. Application Data

(60) Provisional application No. 62/032,951, filed on Aug. 4, 2014, provisional application No. 62/042,902, filed on Aug. 28, 2014.

(51) Int. Cl.
*H02J 3/00* (2006.01)
*G05B 13/02* (2006.01)
(Continued)

(52) U.S. Cl.
CPC .............. *H02J 3/00* (2013.01); *G05B 13/021* (2013.01); *G06Q 10/04* (2013.01); *G06Q 50/06* (2013.01);
(Continued)

(58) Field of Classification Search
None
See application file for complete search history.

(56) References Cited

U.S. PATENT DOCUMENTS 5,677,924 A 10/1997 Bestwick
6,625,520 B1 9/2003 Chen et al.
(Continued)

FOREIGN PATENT DOCUMENTS

JP 2012034452 A 2/2012
JP 2012083989 A 4/2012
(Continued)

OTHER PUBLICATIONS

International Preliminary Report on Patentability for International Application PCT/US2015/043676, Report issued Feb. 7, 2017, dated Feb. 16, 2017, 6 Pgs.
(Continued)

*Primary Examiner* — Mohammad Ali
*Assistant Examiner* — Saad M Kabir
(74) *Attorney, Agent, or Firm* — KPPB LLP

(57) ABSTRACT

Node controllers and power distribution networks in accordance with embodiments of the invention enable distributed power control. One embodiment includes a node controller comprising a memory containing: a plurality of node operating parameters; and a plurality of node operating parameters describing operating parameters for a set of at least one node selected from the group consisting of at least one downstream node and at least one upstream node; wherein the processor is configured by the node controller application to: receive and store in memory a plurality of coordinator parameters describing operating parameters of a node coordinator by the network interface; and calculate updated node operating parameters using an iterative gradient projection process to determine updated node parameters using node operating parameters that describe operating parameters of node and operating parameters of the set of at least one node, where each iteration is determined by the coordinator parameters.

15 Claims, 21 Drawing Sheets

(51) Int. Cl.
  *G06Q 50/06* (2012.01)
  *G06Q 10/04* (2012.01)
(52) U.S. Cl.
  CPC ......... *H02J 2003/007* (2013.01); *Y02E 40/76* (2013.01); *Y02E 60/76* (2013.01); *Y04S 10/545* (2013.01); *Y04S 40/22* (2013.01)

(56) References Cited

U.S. PATENT DOCUMENTS

| | | | |
|---|---|---|---|
| 7,076,360 | B1 | 7/2006 | Ma |
| 7,852,050 | B2 | 12/2010 | Berggren et al. |
| 8,407,016 | B2 | 3/2013 | Slota et al. |
| 9,418,318 | B2 | 8/2016 | Nadar et al. |
| 9,564,757 | B2 | 2/2017 | Wang et al. |
| 9,863,985 | B2 | 1/2018 | Giannakis et al. |
| 9,954,362 | B2 | 4/2018 | Low et al. |
| 2008/0005597 | A1 | 1/2008 | Kern et al. |
| 2008/0077368 | A1 | 3/2008 | Nasle |
| 2010/0217550 | A1 | 8/2010 | Crabtree et al. |
| 2011/0043220 | A1* | 2/2011 | Leibowitz .............. G06F 1/26 324/613 |
| 2012/0029720 | A1* | 2/2012 | Cherian ............... H02J 13/00 700/297 |
| 2012/0200160 | A1 | 8/2012 | Pratt et al. |
| 2012/0203388 | A1 | 8/2012 | DiLuciano et al. |
| 2012/0316691 | A1 | 12/2012 | Boardman et al. |
| 2012/0326503 | A1 | 12/2012 | Birkelund et al. |
| 2013/0238148 | A1 | 9/2013 | Legbedji et al. |
| 2013/0268131 | A1 | 10/2013 | Venayagamoorthy et al. |
| 2013/0274941 | A1 | 10/2013 | Khozikov et al. |
| 2014/0025352 | A1 | 1/2014 | Ghosh et al. |
| 2014/0060065 | A1 | 3/2014 | Sweet et al. |
| 2014/0097683 | A1 | 4/2014 | Piyabongkarn et al. |
| 2014/0316604 | A1 | 10/2014 | Ortjohann et al. |
| 2014/0379157 | A1 | 12/2014 | Das et al. |
| 2015/0051744 | A1 | 2/2015 | Mitra |
| 2015/0340863 | A1 | 11/2015 | Qiuyu et al. |
| 2015/0346753 | A1 | 12/2015 | Gan et al. |
| 2016/0036225 | A1 | 2/2016 | Zhao et al. |
| 2016/0248254 | A1 | 8/2016 | huomo et al. |
| 2016/0254669 | A1 | 9/2016 | Zhang et al. |
| 2016/0315807 | A1 | 10/2016 | Peng et al. |

FOREIGN PATENT DOCUMENTS

| | | |
|---|---|---|
| WO | 2012015507 A1 | 2/2012 |
| WO | 2012058114 A2 | 5/2012 |
| WO | 2012167383 A1 | 12/2012 |
| WO | 2015179873 | 11/2015 |
| WO | 2015184188 A1 | 12/2015 |
| WO | 2016007910 A1 | 1/2016 |
| WO | 2016022603 | 2/2016 |
| WO | 2016172348 | 10/2016 |

OTHER PUBLICATIONS

International Search Report and Written Opinion for International Application No. PCT/US2015/043676, Search completed Oct. 27, 2015, dated Oct. 27, 2015, 8 Pgs.
Alsac, J. et al., "Further developments in Ip-based optimal power flow", IEEE Transactions on Power Systems, vol. 5, Issue 3, Aug. 1990, pp. 697-711.
Baptista, E. C. et al., "Logarithmic barrier-augmented lagrangian function to the optimal power flow problem", International Journal on Electrical Power and Energy Systems, Jun. 23, 2005, vol. 27, No. 7, pp. 528-532.
Baran, M. E. et al., "Network reconfiguration in distribution systems for loss reduction and load balancing", IEEE Transactions on Power Delivery, Apr. 1989, vol. 4, No. 2, pp. 1401-1407.
Capitanescu, F. et al., "Interior-point based algorithms for the solution of optimal power flow problems", Electric Power System Research, Apr. 2007, vol. 77, No. 5-6, pp. 508-517.
Farivar, M. et al., "Inverter VAR control for distribution systems with renewables", In IEEE SmartGridComm, Oct. 17-20, 2011, pp. 457-462.
Farivar, M. et al., "Optimal inverter var control in distribution systems with high pv penetration", In PES General Meeting, Jul. 22-26, 2012, pp. 1-7.
Gan, L. et al., "Convex Relaxations and Linear Approximation for Optimal Power Flow in Multiphase Radial Networks", In Power systems computation conference, Aug. 18-22, 2014, 9 pgs.
Grant, M. et al., "Cvx: Matlab software for disciplined convex programming", online at http://cvxr.com/cvx/, 2008.
Jabr, R. A., "A primal-dual interior-point method to solve the optimal power flow dispatching problem", Optimization and Engineering, Feb. 12, 2003, vol. 4, No. 4, pp. 309-336.
Min, W. et al., "A trust region interior point algorithm for optimal power flow problems", Electrical Power and Energy Systems, May 2005, vol. 27, No. 4, pp. 293-300.
Sousa, A. A. et al., "Robust optimal power flow solution using trust region and interior methods", IEEE Transactions on Power Systems, May 2011, vol. 26, No. 2, pp. 487-499.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93(3), pp. 859-869.
Sturm, J. F. et al., "Using SeDuMi 1.02, a matlab toolbox for optimization over symmetric cones", Optimization Methods and Software, Mar. 1999, vol. 11. No. 1-4, pp. 625-653.
Torres, G. L. et al., "An interior-point method for nonlinear optimal power flow using voltage rectangular coordinates", IEEE Transactions on Power Systems, Nov. 1998, vol. 13, No. 4, pp. 1211-1218.
Turitsyn, K. et al., "Local control of reactive power by distributed photovoltaic generators", In IEEE SmartGridComm, Oct. 4-6, 2010, pp. 79-84.
Xiao, Y. et al., "Power flow control approach to power systems with embedded FACTS devices", IEEE Transactions on Power Systems, Nov. 2002, vol. 17, No. 4, pp. 943-950.
Contaxis, G. C. et al., "Decoupled Optimal Load Flow Using Linear or Quadratic Programming", IEEE Transactions on Power Systems, vol. PWRS-1, No. 2, May 1986, pp. 1-7.
International Preliminary Report on Patentability for International Application PCT/US2015/032482, Report issued Nov. 29, 2016, dated Dec. 8, 2016, 12 pgs.
International Preliminary Report on Patentability for International Application PCT/US2015/033055, Report issued Nov. 29, 2016, dated Dec. 8, 2016, 8 pgs.
International Preliminary Report on Patentability for International Application PCT/US2015/040031, Report issued Jan. 10, 2017, dated Jan. 10, 2017, 7 pgs.
International Preliminary Report on Patentability for International Application PCT/US2016/028659, Report issued Oct. 24, 2017, dated Nov. 2, 2017, 10 pgs.
International Search Report and Written Opinion for International Application PCT/US2015/033055, Report Completed Sep. 9, 2015, dated Sep. 9, 2015, 11 pgs.
International Search Report and Written Opinion for International Application PCT/US2015/040031, Report Completed Sep. 24, 2015, dated Sep. 24, 2015, 9 pgs.
International Search Report and Written Opinion for International Application No. PCT/US2016/028659, Search completed Jul. 27, 2016, dated Jul. 28, 2016, 12 pgs.
International Search Report and Written Opinion for International Application PCT/US2015/032482, Report completed Sep. 9, 2015, dated Sep. 9, 2015, 15 pgs.
"Dynamic demand control of domestic appliances", U. K. Market Transformation Program, Market Transformation Programme, Tech. Rep., 2008, published Nov. 30, 2010, 22 pgs.
"IEEE distribution test feeders", online at available at http://ewh.ieee.org/soc/pes/dsacom/testfeeders/, 3 pgs.
Andreasson et al., "Distributed Control of Networked Dynamical Systems: Static Feedback, Integral Action and Consensus", IEEE Transactions on Automatic Control, vol. 59, Issue 7, Jul. 2014, 16 pgs.

(56) References Cited

OTHER PUBLICATIONS

Andreasson et al., "*Distributed vs. centralized power systems frequency control*", 2013 European Control Conference (ECC), Jul. 17-19, 2013, Zurich, Switzerland, 6 pgs.

Araposthatis et al., "Analysis of power-flow equation", International Journal of Electrical Power & Energy Systems, vol. 3, Issue 3, Jul. 1981, 14 pgs.

Bacciotti et al., "Nonpathological Lyapunov functions and discontinuous Carath'eodory systems", Automatica, vol. 42, Issue 3, Mar. 31, 2006, 6 pgs.

Bai et al., "Semidefinite programming for optimal power flow problems", International Journal of Electrical Power & Energy Systems, vol. 30, Issues 6-7, Jul.-Sep. 2008, pp. 383-392.

Baldick, R. et al., "A fast distributed imple-mentation of optimal power flow", IEEE Transactions on Power Systems, vol. 14, Issue 3, Aug. 1999, pp. 858-864.

Baran et al., "Optimal Capacitor Placement on radial distribution systems", IEEE Transactions on Power Deliver, vol. 4, Issue 1, Jan. 1989, pp. 725-734.

Baran et al., "Optimal Sizing of Capacitors Placed on a Radial Distribution System", IEEE Transactions on Power Delivery, vol. 4, Issue 1, Jan. 1989, pp. 735-743.

Berg et al., "Mechanized Calculation of Unbalanced Load Flow on Radial Distribution Circuits", IEEE Transactions on Power Apparatus and Systems, vol. PAS-86, Issue 4, Apr. 1967, pp. 415-421.

Bergen et al., "Structure preserving model for power system stability analysis", IEEE Transactions on Power Apparatus and Systems, vol. PAS-100, No. 1, 1981, pp. 25-35.

Boyd et al., "Convex Optimization", Cambridge University Press, 2004, Presented in two parts, 384 pgs.

Boyd et al., "Convex Optimization", Cambridge University Press, 2004, Presented in two parts, 346 pgs.

Boyd et al., "Distributed Optimization and Statistical Learning via the Alternating Direction Method of Multipliers", Foundations and Trends in Machine Learning, vol. 3, No. 1, 2010, 125 pgs.

Brooks et al., "Demand Dispatch", IEEE Power and Energy Magazine, vol. 8, Issue 3, May-Jun. 2010, 10 pgs.

Burger et al., "An internal model approach to (optimal) frequency regulation in power grids", arXiv: 1403.7019, Mar. 27, 2014, 14 pgs.

Cain et al., "History of optimal power flow and formulations; Optimal Power Flow Paper 1", Federal Energy Regulatory Commission, Dec. 2012, 36 pgs.

Callaway et al., "Achieving Controllability of Electric Loads", Proceedings of the IEEE, vol. 99, Issue 1, Jan. 2011, pp. 184-199.

Castillo et al., "Survey of approaches to solving the ACOPF; Optimal Power Flow Paper 4", Federal Energy Regulatory Commission, Mar. 2013, 49 pgs.

Chen et al., "Distribution system power flow analysis-a rigid approach", IEEE Transactions on Power Delivery, vol. 6, Issue 3, Jul. 1991, pp. 1146-1152.

Cheng et al., "Three-Phase Power Flow Method for Real-Time Distribution System Analysis", IEEE Transactions on Power Systems, vol. 10, May 1995, 9 pgs.

Cherukuri et al., "Asymptotic convergence of primal-dual dynamics", Systems & Control Letters, vol. 87, Jan. 31, 2016, 20 pgs.

Cheung et al., "Power System Toolbox Version 3.0", Rensselaer Polytechnic Institute and Cherry Tree Scientific Software, 2009, 123 pgs.

Chow et al., "A toolbox for power system dynamics and control engineering education and research", IEEE Transactions on Power Systems, vol. 7, Issue 4, Nov. 1992, pp. 1559-1564.

Dall'anese et al., "Distributed Optimal Power Flow for Smart Microgrids", EEE Transactions on Smart Grid, arXiv: 1211.5856v5, Jan. 25, 2014, Retrieved from the Internet: http://arxiv.org/pdf/1211.5856.pdf>, 11 pgs.

Dall'anese et al., "Distributed Optimal Power Flow for Smart Microgrids", IEEE Transactions on Smart Grid, vol. 4, Issue 3, Sep. 2013, 12 pgs.

Devane, E. et al., "Stability and convergence of distributed algorithms for the OPF problem", 52nd IEEE Conference on Decision and Control, Dec. 10-13, 2013, Florence, Italy, 6 pgs.

Donnelly et al., "Frequency and stability control using decentralized intelligent loads: Benefits and pitfalls", IEEE PES General Meeting, Jul. 25-29, 2010, Providence, RI, USA, 6 pgs.

Dorfler et al., "Breaking the Hierarchy: Distributed Control and Economic Optimality in Microgrids", IEEE Transactions on Control of Network Systems, vol. 3, Issue 3, Sep. 2016, 10 pgs.

Dorfler et al., "Plug-and-Play Control and Optimization in Microgrids", 53rd IEEE Conference on Decision and Control, Dec. 15-17, 2014, Los Angeles, CA, USA, 8 pgs.

Dupuis, "Dynamical systems and variational inequalities", Annals of Operations Research, vol. 44, No. 1, Feb. 28, 1993, 37 pgs.

Farivar, M. et al., "Branch flow model: relaxations and convexification (parts I, II)", IEEE Trans. on Power Systems, Aug. 2013, vol. 28, No. 3, 21 pgs.

Farivar et al., "Branch Flow Model relaxations, convexification", Computing + Math Sciences Electrical Engineering, Caltech, May 2012, 69 pgs.

Feijer et al., "Stability of primal-dual gradient dynamics and applications to network optimization", Automatica, vol. 46, Issue 12, Dec. 2010, pp. 1974-1981.

Frank et al., "Opti-mal power flow: a bibliographic survey I, Formulations and deterministic methods", Energy Systems, 2012, vol. 3, No. 3, 38 pgs.

Fukuda et al., "Exploiting sparsity in semidefinite programming via matrix completion i: General framework", SIAM Journal on Optimization, 2001, vol. 11, No. 3, pp. 647-674.

Gan et al., "Exact Convex Relaxation of Optimal Power Flow in Radial Networks", IEEE Transactions on Automatic Control, vol. 60, Issue: 1, Jan. 2015, pp. 72-87.

Gan et al., "Optimal power flow in distribution networks", Proc. 52nd IEEE Conference on Decision and Control, Dec. 2013, in arXiv: 12084076, 7 pgs.

Guo et al., "Nonlinear decentralized control of large-scale power systems", Automatica, vol. 36, Issue 9, Sep. 2000, pp. 1275-1289.

Hammerstrom et al., "Pacific Northwest GridWse Testbed Demonstration Projects Part II. Grid Friendly Appliance Project", Pacific Northwest National Laboratory, Technical Report No. PNNL-17079, Oct. 2007, 123 pgs.

Hill et al., "Stability analysis of multimachine power networks with linear frequency dependent loads", IEEE Transactions on Circuits and Systems, vol. 29, Issue 12, Dec. 1982, pp. 840-848.

Huneault et al., "A survey of the opt-imal power flow literature", IEEE Transactions on Power Systems, May 1991, vol. 6, No. 2, pp. 762-770.

Ilic, Marija D. "From Hierarchical to Open Access Electric Power Systems", Proceedings of the IEEE, vol. 95, Issue 5, May 2007, pp. 1060-1084.

Jabr et al., "Radial Distribution Load Flow Using Conic Programming", IEEE Transactions on Power Systems, Aug. 2006, vol. 21, Issue 3, pp. 1458-1459.

Jakobsson, Martin "On Some Extensions and Performance of Fast-Lipschitz Optimization", Master's Degree Project Stockholm, Sweden, Oct. 2011. Retrieved from the Internet: <http://www.diva-portal.org/smash/get/diva2:471914/FULLTEXT01.pdf> See abstract, 84 pgs.

Jiang et al., "Toward a globally robust decentralized control for large-scale power systems", IEEE Transactions on Control Systems Technology, vol. 5, Issue 3, May 1997, pp. 309-319.

Kelly et al., "Rate Control for Communication Networks: Shadow Prices, Proportional Fairness and Stability", The Journal of the Operational Research Society, vol. 49, No. 3, Mar. 1998, 16 pgs.

Kersting, W H. "Radial distribution test feeders", IEEE Transactions on Power Systems, vol. 6, Issue 3, Aug. 1991, pp. 975-985.

Kersting et al., "Distribution System Modeling and Analysis", CRC Press, 2006, Presented in three parts, 100 pgs.

Kersting et al., "Distribution System Modeling and Analysis", CRC Press, 2006, Presented in three parts, 129 pgs.

(56) References Cited

OTHER PUBLICATIONS

Kiani et al., "A hierarchical transactive control architecture for renewables integration in Smart Grids", 2012 IEEE 51st IEEE Conference on Decision and Control (CDC), Dec. 10-13, 2012, Maui, HI, USA, pp. 4985-4990.

Kim, B. H. et al., "Coarse-grained distributed optimal power flow", IEEE Transactions on Power Systems, vol. 12, Issue 2, May 1997, pp. 932-939.

Kraning et al., "Dynamic Network Energy Management via Proximal Message Passing", Foundations and Trends in Optimization, vol. 1, 2013, 57 pgs.

Lam, A. et al., "Optimal Distributed Voltage Regulation in Power Distribution Networks", arXiv: 1204.5226, Apr. 23, 2012, retrieved from https://arxiv.org/abs/1204.5226v1, 24 pgs.

Lam et al., "Distributed algorithms for optimal power flow problem", 2012 IEEE 51st IEEE Conference on Decision and Control (CDC), Dec. 10-13, 2012, Maui, HI, USA, 12 pgs.

Lavaei et al., "Zero duality gap in optimal power flow problem", IEEE Transactions on Power Systems, 2012, vol. 27, No. 1, 13 pgs.

Lavaei et al., "Zero Duality Gap in Optimal Power Flow Problem", IEEE Transactions on Power Systems, vol. 27, Issue 1, Feb. 2012, 16 pgs.

Li, N. et al., "Demand response in radial distribution networks: Distributed algorithm", 2012 Conference Record of the Forty Sixth Asilomar Conference on Signals, Systems and Computers (ASILOMAR), Nov. 4-7, 2012, Pacific Grove, CA, USA, 5 pgs.

Li et al., "Connecting Automatic Generation Control and Economic Dispatch from an Optimization View", 2014 American Control Conference (ACC), Jun. 46, 2014, Portland, Oregon, USA, pp. 735-740.

Li et al., "Optimal demand response based on utility maximization in power networks", 2011 IEEE Power and Energy Society General Meeting, Jul. 24-29, 2011, Detroit, MI, USA, 8 pgs.

Liu et al., "Decentralized Multi-Agent System-Based Cooperative Frequency Control for Autonomous Microgrids With Communication Constraints", IEEE Transactions on Sustainable Energy, vol. 5, Issue 2, Apr. 2014, pp. 446-456.

Low, "Convex Relaxation of Optimal Power Flow Part I: Formulations and Equivalence", IEEE Trans. on Control of Network Systems, Mar. 2014, 44 pgs.

Low, "Convex Relaxation of Optimal Power Flow—Part II: Exactness", IEEE Transactions on Control of Network Systems, Jun. 2014, vol. 1, No. 2, 13 pgs.

Low et al., "Optimization Flow Control-I: Basic Algorithm and Convergence", IEEE/ACM Transactions on Networking, vol. 7, Issue 6, Dec. 1999, pp. 861-874.

Lu et al., "Design Considerations for Frequency Responsive Grid Friendly Appliances", 2005/2006 IEEE/PES Transmission and Distribution Conference and Exhibition, May 21-24, 2006, Dallas, TX, USA, 6 pgs.

Lu et al., "Nonlinear stabilizing control of multimachine systems", IEEE Transactions on Power Systems, vol. 4, Issue 1, Feb. 1989, pp. 236-241.

Lygeros et al., "Dynamical properties of hybrid automata", IEEE Transactions on Automatic Control, vol. 48, Issue 1, Jan. 31, 2003, 17 pgs.

Mallada et al., "Distributed Frequency-Preserving Optimal Load Control", Proceedings of the 19th World Congress, IFAC Proceedings Volumes, vol. 47, Issue 3, Aug. 24-29, 2014, Cape Town, South Africa, pp. 5411-5418.

Mallada et al., "Fair load-side control for frequency regulation in smart grids", Proc. of Allerton Conference on Communication, Control, and Computing, Monticello, IL, USA, 2014, 10 pgs.

Mallada et al., "Optimal load-side control for frequency regulation in smart grids", 2014 52nd Annual Allerton Conference on Communication, Control, and Computing (Allerton), Sep. 30, 2014-Oct. 3, 2014, pp. 731-738.

Molina-Garcia et al., "Decentralized Demand-Side Contribution to Primary Frequency Control", IEEE Transactions on Power Systems, vol. 26, Issue 1, Feb. 2011, pp. 411-419.

Momoh et al., "A review of selected optimal power flow literature to 1993. Part I: Nonlinear and quadratic programming approaches", IEEE Transactions on Power Systems, Feb. 1999, vol. 14, No. 1, pp. 96-104.

Moon et al., "The development of equivalent system technique for deriving an energy function reflecting transfer conductances", IEEE Transactions on Power Systems, vol. 14, Issue 4, Nov. 1999, pp. 1335-1341.

O'Neill et al., "The IV Formulation and Linear Approximations of the AC Optimal Power Flow Problem", Optimal Power Flow Paper, Dec. 2012, 18 pgs.

Ortega et al., "Transient stabilization of multimachine power systems with nontrivial transfer conductances", IEEE Transactions on Automatic Control, vol. 50, Issue 1, Jan. 2005, pp. 60-75.

Palomar et al., "A tutorial on decomposition methods for network utility maximization", IEEE Journal on Selected Areas in Communications, vol. 24, Issue 8, Aug. 2006, pp. 1439-1451.

Pandya et al., "A survey of optimal power flow methods", Journal of Theoretical and Applied Information Technology, 2008, vol. 4, No. 5, pp. 450-458.

Peng et al., "Distributed algorithm for optimal power flow on a radial network", 53rd IEEE Conference on Decision and Control, Dec. 15-17, 2014, Los Angeles, CA, USA, pp. 167-172.

Peng et al., "Feeder Reconfiguration in Distribution Networks Based on Convex Relaxation of OPF", IEEE Transactions on Power Systems, vol. 30, Issue 4, Jul. 2015, 11 pgs.

Phan et al., "Distributed Methods for Solving the Security-Constrained Optimal Power Flow Problem", IEEE PES Innovative Smart Grid Technologies (ISGT), 2012, Jan. 16-20, 2012, 7 pgs.

Qu et al., "Application of robust control to sustained oscillations in power systems", IEEE Transactions on Circuits and Systems I: Fundamental Theory and Applications, vol. 39, Issue 6, Jun. 1992, pp. 470-476.

Schweppe et al., "Homeostatic Utility Control", IEEE Transactions on Power Apparatus and Systems, vol. PAS-99, Issue 3, May 1980, pp. 1151-1163.

Shafiee et al., "Distributed Secondary Control for Islanded Microgrids—a Novel Approach", IEEE Transactions on Power Electronics, vol. 29, Issue 2, Feb. 2014, 15 pgs.

Short et al., "Stabilization of Grid Frequency Through Dynamic Demand Control", IEEE Transactions on Power Systems, vol. 22, Issue 3, Aug. 2007, 11 pgs.

Siljak et al., "Robust decentralized turbine/governor control using linear matrix inequalities", IEEE Transactions on Power Systems, vol. 17, Issue 3, Aug. 2002, pp. 715-722.

Simpson-Porco et al., "Stability, power sharing, & distributed secondary control in droop-controlled microgrids", 2013 IEEE International Conference on Smart Grid Communications (SmartGridComm), Oct. 21-24, 2013, Vancouver, BC, Canada, pp. 672-677.

Simpson-Porco et al., "Synchronization and power sharing for droop-controlled inverters in islanded microgrids", Automatica, vol. 49, Issue 9, Sep. 2013, 11 pgs.

Srinivasa et al., "Herb: a home exploring robotic butler", Autonomous Robots, 2010, vol. 28, pp. 5-20.

Sun, A. X. et al., "Fully decentralized AC optimal power flow algorithms", 2013 IEEE Power & Energy Society General Meeting, Jul. 21-25, 2013, Vancouver, BC, Canada, 5 pgs.

Tao, "Optimal Power Flow Via Quadratic Modeling", Dec. 2011, 194 pgs.

Taylor et al., "Convex models of distribution system reconfiguration", IEEE Transactions on Power Systems, vol. 6, No. 1, Jan. 2007 5 pgs.

Topcu et al., "Compositional stability analysis based on dual decomposition", Proceedings of the 48h IEEE Conference on Decision and Control (CDC) held jointly with 2009 28th Chinese Control Conference, Dec. 15-18, 2009, Shanghai, China, 6 pgs.

Trudnowski et al., "Power-System Frequency and Stability Control using Decentralized Intelligent Loads", 2005/2006 IEEE/PES Transmission and Distribution Conference and Exhibition, May 21-24, 2006, Dallas, TX, USA, 7 pgs.

(56) References Cited

OTHER PUBLICATIONS

Tsolas et al., "A structure preserving energy function for power system transient stability analysis", IEEE Transactions on Circuits and Systems, vol. 32, Issue 10, Oct. 1985, pp. 1041-1049.

Wang et al., "Robust decentralized control for multimachine power systems", IEEE Transactions on Circuits and Systems I: Fundamental Theory and Applications, vol. 45, Issue 3, Mar. 1998, pp. 271-279.

You et al., "Reverse and forward engineering of frequency control in power networks", 53rd IEEE Conference on Decision and Control, Dec. 15-17, 2014, Los Angeles, CA, USA, 9 pgs.

Zhang et al., "A real-time control framework for smart power networks with star topology", 2013 American Control Conference, Jun. 17-19, 2013, Washington, DC, USA, pp. 5062-5067.

Zhang et al., "Distributed dynamic feedback control for smart power networks with tree topology", 2014 American Control Conference, Jun. 4-6, 2014, Portland, OR, USA, pp. 1156-1161.

Zhang et al., "Geometry of feasible injection region of power networks", 2011 49th Annual Allerton Conference on Communication, Control, and Computing (Allerton), Sep. 28-30, 2011, pp. 1508-1515.

Zhao et al., "Design and Stability of Load-Side Primary Frequency Control in Power Systems", IEEE Transactions on Automatic Control, vol. 59, Issue 5, May 2014, pp. 1177-1189.

Zhao et al., "Power System Dynamics as Primal-Dual Algorithm for Optimal Load Control", arXiv: 1305.0585, May 6, 2013, 35 pgs.

Zhao et al., "Swing dynamics as primal-dual algorithm for optimal load control", 2012 IEEE Third International Conference on Smart Grid Communications (SmartGridComm), Nov. 5-8, 2012, Tainan, Taiwan, 6 pgs.

\* cited by examiner

Process 2 Line search

Input: back-off parameter $\alpha \in (0,1)$, linearization-criteria parameter $\beta \in (0,1)$, slow-progress parameter $\epsilon \ll 1$, current solution $(p, q)$, bounds $(\underline{p}, \overline{p}, \underline{q}, \overline{q}, \underline{v}, \overline{v})$, gradient $\partial_{p,q} L$.

Output: update value $(p', q')$, $p'$, $q'$, stopping flag stopFlag.

1: $\eta = 1$, stopFlag = 0;
2: $(p', q') \leftarrow (p, q) - \eta \partial_{p,q} L$;
3: $p', q' \leftarrow \Pi_{\underline{p}, \overline{p}} p', q' \leftarrow \Pi_{\underline{q}, \overline{q}} q'$;
4: run the backward-forward sweep process to obtain the power flow solution $(v', \nu'_0, \phi'_0)$ with respect to $(p', q', v_0)$;
5: if $v' \notin [\underline{v}, \overline{v}]$
   $\eta \leftarrow \alpha \eta$, go to 2;
   end
6: $\Delta p \leftarrow p' - p, \Delta q \leftarrow q' - q$;
7: if $\|\Delta p\| + \|\Delta q\| \leq \epsilon$
   stopFlag = 1;
   else if $L(p', q') > L(p, q) + \beta (\partial_p L \cdot \Delta p + \partial_q L \cdot \Delta q)$
   $\eta \leftarrow \alpha \eta$, go to 2;
   end
8: if $L(p', q') > L(p, q)$
   $p' \leftarrow p, q' \leftarrow q$;
   end

*FIG. 10*

Process 3 A gradient decent process
Input: A feasible point $(p_i, q_i)$.
Output: A numerical solution $(p^*, q^*)$ of (2).

1: $p_i^0 = p_i, q_i^0 = q_i$
2: for $\mu = \mu_1, \mu_2, \ldots, \mu_K$
3:   do
4:     run backward-forward sweep to obtain the power flow solution $(v^*, p_0^*, q_0^*)$ at $(p^*, q^*, v_0)$;
5:     compute gradient $\partial_{(p,q)} L(p^*, q^*, \mu)$;
6:     run Process 2 to get an updated $(p^*, q^*, \mu)$;
7:   while stopFlag $!= 1$
8: end

FIG. 11

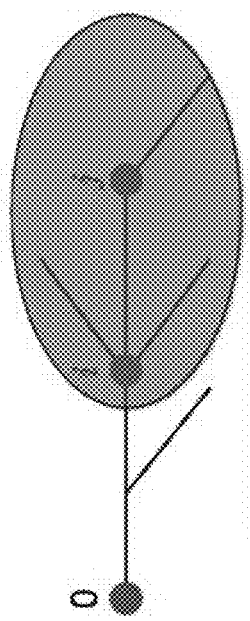

← Backward sweep to update $(g, h)$

→ Forward sweep to update $(c, d, e, f)$

FIG. 12

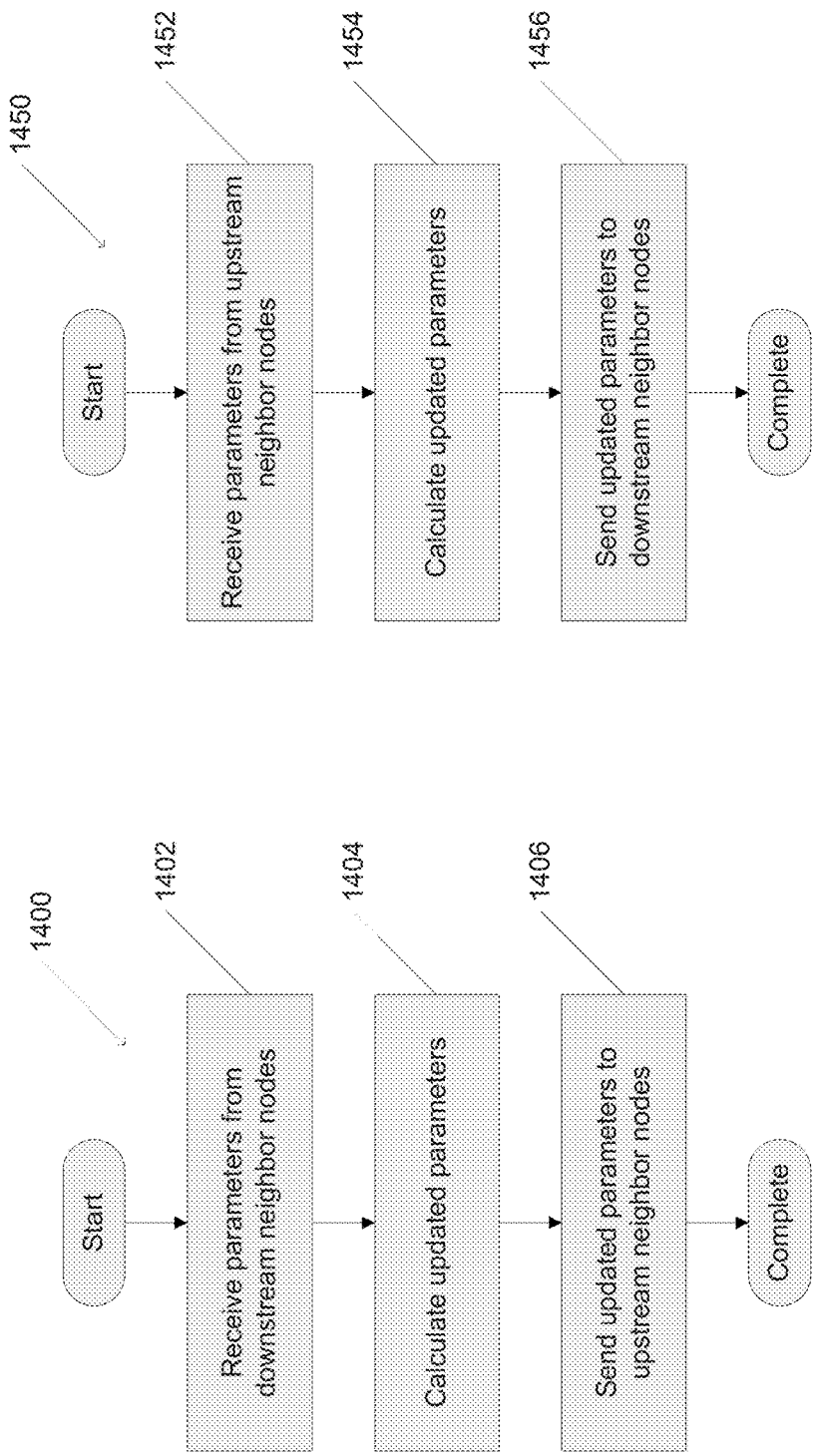

Process 4 Distributed gradient computation

Input: each agent $i \in \mathcal{N}^+$ knows parameter $(\underline{v}_i, \overline{v}_i)$, voltage $v_0$, impedance $(r_{ij}, x_{ij})$ for neighboring lines $i \sim j$, and power flow $(P_{ij}, Q_{ij})$ for downstream lines $i \to j$.

Output: each agent $i \in \mathcal{N}^+$ computes $(\partial_{p_i} L, \partial_{q_i} L)$ for $i \in \mathcal{N}^+$.

Backward sweep to compute $(g_i, h_i)$:

1: initialization: each leaf bus $i \in \mathcal{L}$ sets
$$g_i \leftarrow -\left(\frac{\mu_i}{v_i - \underline{v}_i} + \frac{\overline{\mu}_i}{v_i - \overline{v}_i}\right); \quad h_i \leftarrow 0,$$

and sends $(g_i, h_i)$ to its (unique) upstream neighbor;

2: backward sweep: each agent $i \in \mathcal{N}^+$, on receiving $(g_j, h_j)$ from all its downstream neighbors $j$, computes $(g_i, h_i)$ according to $$g_i = \frac{\mu_i}{v_i - \underline{v}_i} + \frac{\overline{\mu}_i}{v_i - \overline{v}_i} + \sum_{j: i \to j} g_j; \quad h_i = \sum_{j: i \to j}\left(\frac{2r_{ij}g_j}{v_0} + h_j\right),$$  (10)

and sends $(g_i, h_i)$ to its (unique) upstream neighbor;

3: termination: backward sweep is completed when bus 0 receives $(g_j, h_j)$ from all its downstream neighbors $j$.

Forward sweep to compute $(c_i, d_i, e_i, f_i)$:

4: initialization: Forward sweep starts when backward sweep is terminated. The root bus 0 sets
$$c_0 \leftarrow 0, \quad d_0 \leftarrow 0, \quad e_0 \leftarrow 0, \quad f_0 \leftarrow 0,$$

5: forward sweep: each agent $j \in \mathcal{N}^+$, on receiving $(c_i, d_i, e_i, f_i + 2r_{ij}P_{ij}/v_0 f_j + 2r_{ij}Q_{ij}/v_0)$ from its (unique) upstream neighbor $i$, computes $c_j, d_j, e_j, f_j$ according to (9), and sends $(c_j, d_j, e_j, e_j + 2r_{jk}P_{jk}/v_0, f_j + 2r_{jk}Q_{jk}/v_0)$ to each downstream neighbor $k$;

Compute gradients.

Computation of gradients starts concurrently with forward sweep.

6: the substation bus 0 broadcasts $2x_0p_0 + h_0$ to all branch buses $i \in \mathcal{N}^+$;

7: each agent $i \in \mathcal{N}^+$, on receiving $2x_0p_0 + h_0$ from the substation and having computed $(c_i, d_i, e_i, f_i)$, computes $\partial_{p_i} L$ and $\partial_{q_i} L$ according to (8);

| # bus | CVX | | IPM | | error | speedup |
| --- | --- | --- | --- | --- | --- | --- |
| | obj | time(s) | obj | time(s) | | |
| 42 | 10.4585 | 6.5267 | 10.4585 | 0.2679 | -0.0e-7 | 24.36 |
| 56 | 34.8989 | 7.1077 | 34.8989 | 0.3924 | +0.2e-7 | 18.11 |
| 111 | 0.0751 | 11.3793 | 0.0751 | 0.8529 | +5.4e-6 | 13.34 |
| 190 | 0.1394 | 20.2745 | 0.1394 | 1.9968 | +3.3e-6 | 10.15 |
| 290 | 0.2817 | 23.8817 | 0.2817 | 4.3564 | +1.1e-7 | 5.48 |
| 390 | 0.4292 | 29.8620 | 0.4292 | 2.9405 | +5.4e-7 | 10.16 |
| 490 | 0.5526 | 36.3591 | 0.5526 | 3.0072 | +2.9e-7 | 12.09 |
| 590 | 0.7035 | 43.6932 | 0.7035 | 4.4655 | +2.4e-7 | 9.78 |
| 690 | 0.8546 | 51.9830 | 0.8546 | 3.2247 | +0.7e-7 | 16.12 |
| 790 | 0.9975 | 62.3654 | 0.9975 | 2.6228 | +0.7e-7 | 23.78 |
| 890 | 1.1685 | 67.7256 | 1.1685 | 2.0507 | +0.8e-7 | 33.03 |
| 990 | 1.3930 | 74.8522 | 1.3930 | 2.7747 | +1.0e-7 | 26.98 |
| 1091 | 1.5869 | 83.2236 | 1.5869 | 1.0869 | +1.2e-7 | 76.57 |
| 1190 | 1.8123 | 92.4484 | 1.8123 | 1.2121 | +1.4e-7 | 76.27 |
| 1290 | 2.0134 | 101.0380 | 2.0134 | 1.3525 | +1.6e-7 | 74.70 |
| 1390 | 2.2007 | 111.0839 | 2.2007 | 1.4883 | +1.7e-7 | 74.64 |
| 1490 | 2.4523 | 122.1819 | 2.4523 | 1.6372 | +1.9e-7 | 74.83 |
| 1590 | 2.6477 | 157.8238 | 2.6477 | 1.8021 | +2.0e-7 | 87.58 |
| 1690 | 2.8441 | 147.6862 | 2.8441 | 1.9166 | +2.1e-7 | 77.06 |
| 1790 | 3.0495 | 152.6081 | 3.0495 | 2.0603 | +2.1e-7 | 74.07 |
| 1890 | 3.8555 | 160.4689 | 3.8555 | 2.1963 | +1.9e-7 | 73.06 |
| 1990 | 4.1424 | 171.8137 | 4.1424 | 2.3586 | +1.9e-7 | 72.84 |

*FIG. 22*

DISTRIBUTED GRADIENT DESCENT FOR SOLVING OPTIMAL POWER FLOW IN RADIAL NETWORKS

CROSS-REFERENCE TO RELATED APPLICATIONS

The present invention claims priority to U.S. Provisional Patent Application Ser. No. 62/032,951 entitled "Distributed Gradient Decent for Solving for Optimal Power Flow in Multiphase Radial Networks" to Gan et al, filed Aug. 4, 2014, and U.S. Provisional Patent Application Ser. No. 62/042,902 entitled "Distributed Gradient Descent for Solving for Optimal Power Flow in Multiphase Radial Networks" to Gan et al., filed Aug. 28, 2014. The disclosures of U.S. Provisional Patent Application Ser. Nos. 62/032,951 and 62/042,902 are herein incorporated by reference in their entirety.

STATEMENT OF FEDERALLY SPONSORED RESEARCH

This invention was made with government support under DE-AR000022 awarded by the Department of Energy and under CNS0911041 awarded by the National Science Foundation. The government has certain rights in the invention.

FIELD OF THE INVENTION

The present invention generally relates to optimal power flow and more specifically relates to distributed gradient projection processes for solving for optimal power flow.

BACKGROUND

An incredible amount of infrastructure is relied upon to transport electricity from power stations, where the majority of electricity is currently generated, to individual homes. Power stations can generate electricity in a number of ways including using fossil fuels or using renewable sources of energy such as solar, wind, and hydroelectric sources. Once electricity is generated it travels along transmission lines to substations. Substations typically do not generate electricity, but can change the voltage level of the electricity as well as provide protection to other grid infrastructure during faults and outages. From here, the electricity travels over distribution lines to bring electricity to individual homes. The infrastructure used to transport electricity through the power grid can be viewed as a graph comprised of nodes and lines. The power stations, substations, and any end user can be considered nodes within the graph. Transmission and distribution lines connecting these nodes can be represented by lines.

Distributed power generation, electricity generation at the point where it is consumed, is on the rise with the increased use of residential solar panels and is fundamentally changing the path electricity takes to many users' homes. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional locations along the electrical grid.

SUMMARY OF THE INVENTION

Node controllers and power distribution networks in accordance with embodiments of the invention enable distributed power control. One embodiment includes a node controller comprising a network interface; a processor; a memory containing: a node controller application; a plurality of node operating parameters describing the operating parameters of a node; and a plurality of node operating parameters describing operating parameters for a set of at least one node selected from the group consisting of at least one downstream node and at least one upstream node; wherein the processor is configured by the node controller application to: receive and store in memory a plurality of coordinator parameters describing the operating parameters of a node coordinator by the network interface; and calculate a plurality of updated node operating parameters using an iterative gradient projection process to determine the updated node parameters using the node operating parameters that describe the operating, parameters of the node and the operating parameters of the set of at least one node, where each iteration in the iterative process is determined by the coordinator parameters.

In a further embodiment, the iterative gradient projection process is a distributed process.

In another embodiment, the iterative gradient projection process further comprises a backwards forwards sweep process.

In a still further embodiment, the iterative gradient projection process further comprises calculating gradient parameters.

In still another embodiment, the iterative gradient projection process further comprises calculating a gradient step size.

In a yet further embodiment, the backward forward sweep process further comprises a backward sweep process and a forward sweep process.

In yet another embodiment, the backward sweep process further comprises: receiving operating parameters from the one or more downstream nodes; calculating a plurality of updated node operating parameters using the operating parameters from the one or more downstream nodes; and sending the plurality of updated node operating parameters to the one or more upstream nodes.

In a further embodiment again, the forward sweep process further comprises: receiving operating parameters from the one or more upstream nodes; calculating a plurality of updated node operating parameters using the operating parameters from the one or more upstream nodes; and sending the plurality of updated node operating, parameters to the one or more downstream nodes.

In another embodiment again, calculating, gradient parameters further comprises exact calculation of the gradient parameters.

In a further additional embodiment, calculating gradient parameters further comprises an approximation of the gradient parameters.

In another additional embodiment, calculating gradient parameters is a distributed process.

In a still yet further embodiment, calculating a gradient step size is evaluated using a line search.

In still yet another embodiment, the node is part of a radial network topology.

In a still further embodiment again, node operating parameters include power injection, current, and impedance.

In still another embodiment again, the node is configured to control operating parameters as components in a single phase power distribution network.

Another further embodiment of the method of the invention includes: the node is configured to control operating parameters as components in a multiphase balanced power distribution network.

Still another further embodiment of the method of the invention includes: the node is configured to control operating parameters as components in a multiphase unbalanced power distribution network.

BRIEF DESCRIPTION OF THE DRAWINGS

FIG. 10 is pseudocode illustrating a line search process utilized in a gradient projection process solving for optimal power flow in accordance with an embodiment of the invention.

FIG. 11 is pseudocode illustrating a process to solve for optimal power flow a gradient descent process solving for optimal power flow in accordance with an embodiment of the invention.

FIG. 12 is a diagram illustrating backwards sweep process and forwards sweep process utilized in a gradient decent process for solving for optimal power flow.

FIGS. 14A-14B are flow charts illustrating a distributed backwards sweep process and a distributed forwards sweep respectively utilized in a gradient projection process to solve for optimal power flow, in accordance with an embodiment of the invention.

FIG. 15 is pseudocode illustrating a distributed gradient process utilized in solving for optimal power flow in accordance with an embodiment of the invention.

FIG. 18 is pseudocode illustrating a distributed gradient decent process utilized in solving for optimal power flow in accordance with an embodiment of the invention.

FIG. 20 is a table illustrating parameters of a 47-node (47-bus) network.

FIG. 21 is a table illustrating parameters of a 56-node (56-bus) network.

FIG. 22 is a table illustrating simulated results of a distributed gradient projection process.

DETAILED DESCRIPTION

Figure 1:
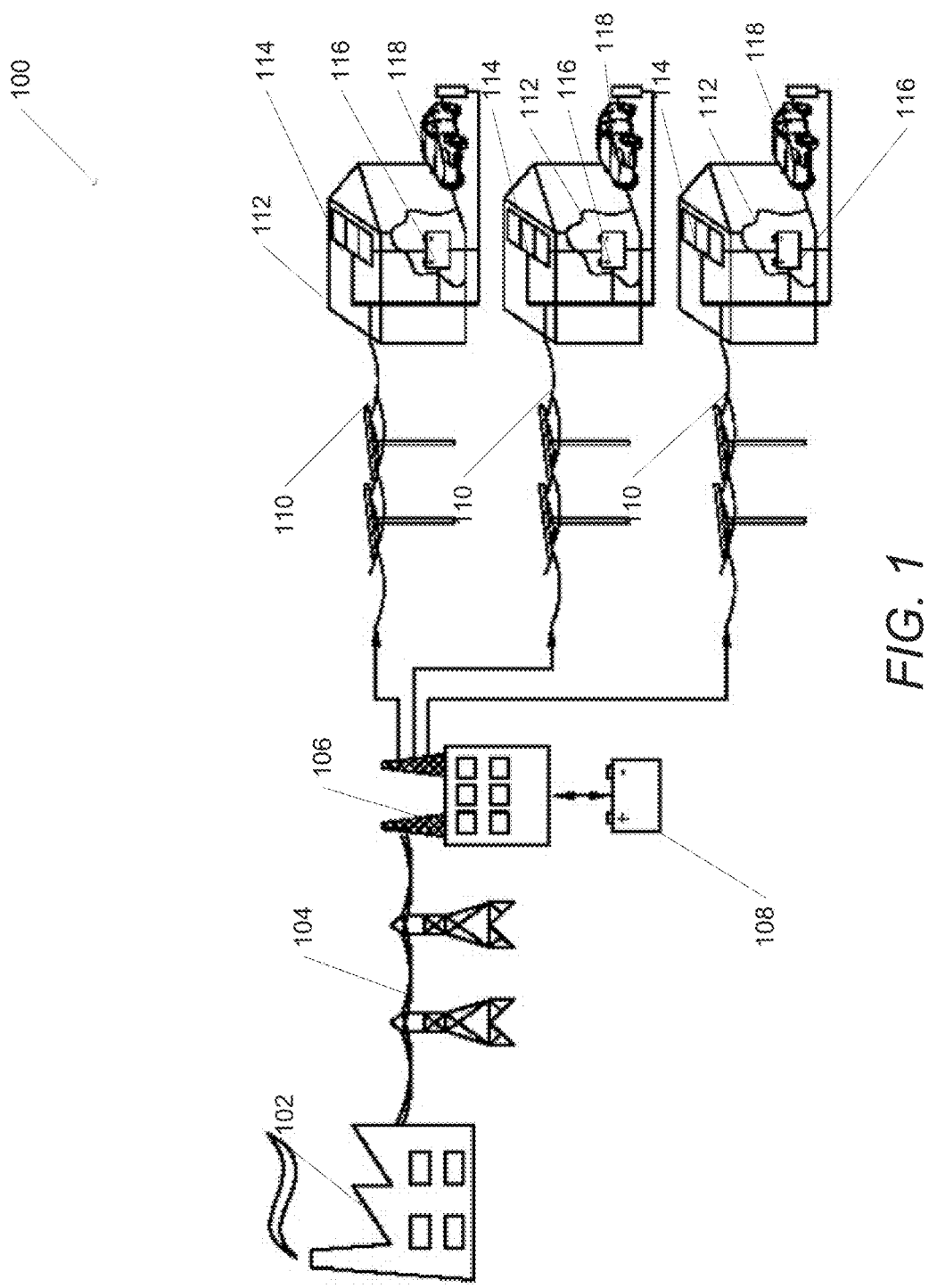
FIG. 1 is a diagram conceptually illustrating a power distribution network in accordance with an embodiment of the invention.

Turning now to the drawings, systems and methods for distributed control of power distribution systems configured as radial networks in accordance with embodiments of the invention are illustrated. Radial networks have a tree topology where each node is connected to a single unique ancestor and a set of children. Ancestor nodes and any ancestors of ancestor nodes are typically upstream nodes. Similarly, children nodes and any children of children nodes are typically downstream nodes. Radial networks are commonly utilized in modeling the distribution side of the power grid. In many embodiments, processing nodes are distributed throughout the pourer distribution network that control power load, distributed power generation, and remote battery storage. In several embodiments, the processing nodes control the operational parameters of aspects of the power distribution network in an effort to achieve what is often referred to as Optimal Power Flow (OPF). Achieving OPF involves optimizing the operation of a power system with respect to one or more objectives. These objectives can include (but are not limited to) minimizing the amount of power lost during the transmission of power to a user, minimizing the cost of generating the power needed for the system, and/or seeking to optimize other general operational constraints.

In a number of embodiments, the processing nodes within the power distribution network perform centralized, distributed, or hybrid processes that coordinate the control of the power distribution network. Centralized processes can use a centralized processing unit to calculate optimal power flow of all nodes within the network. Distributed processes can be based upon messages passed between the processing node and its upstream and/or downstream nodes within the radial network. Hybrid processes use a combination of centralized and distributed processing steps. In several embodiments, individual processing nodes determine the voltage, power injection, current, and/or impedance of a given power load, distributed power generation, or remote battery storage within the power distribution network by performing a gradient calculation. In many embodiments, this gradient calculation can be part of a gradient projection process (sometimes referred to as a gradient descent process).

Gradient projection processes typically involve a gradient calculation and choosing a step size to update optimization parameters. Gradient calculations can involve exact and/or approximate calculations of gradients. In various embodiments, gradient calculations can be distributed processes. In many embodiments, a line search can be utilized to update step size. In many embodiments a line search may also be a distributed calculation.

Systems and methods for performing distributed control of radial power distribution networks to achieve OPF and solutions to the distributed OPF problem that can be utilized in the implementation of such systems and methods in accordance with embodiments of the invention are discussed further below.

Radial Power Distribution Networks

A power distribution network in accordance with an embodiment of the invention is shown in FIG. 1. Electricity is generated in power generator 102. Power transmission lines 104 can transmit electricity between the power generator and power substation 106. Power substation 106 additionally can connect to large storage battery 108, which temporarily stores electricity, as well as power distribution lines 110. The power distribution lines 110 can transmit electricity from the power substation to homes 112. The homes can include solar panels 114, a house battery 116, and/or an electric car 118. Power distribution networks can transmit electricity in many ways. When alternating current is used, voltage reverses direction at regular intervals. When only one voltage source is used, the power distribution network is described as single phase. When several sources are used, and the sources are equally distributed in equally spaced regular intervals (typically 120 degrees for a commonly used three phase network), the power distribution network is described as a multiphase balanced network. Single phase problems and multiphase balanced network problems can often be solved with similar analysis. In the discussion to follow, networks that distribute power in a single phase or a multiphase balanced manner will both be referred to as single phase networks. An alternative method of distributing power is multiphase unbalanced. In this manner of power distribution, several voltage sources are unevenly spaced. Multiphase unbalanced networks often require different analysis than single phase networks and will be referred to as multiphase networks in the discussion to follow.

The power generator 102 can represent a power source including those using fossil fuels, nuclear, solar, wind, or hydroelectric power. Substation 106 changes the voltage of the electricity for more efficient power distribution. Solar panels 114 are distributed power generation sources, and can generate power to supply the home as well as generate additional power for the power grid. House battery 116 can store excess electricity from the solar panels to power the home when solar energy is unavailable, or store electricity from the power grid to use at a later time. Substations 106, large storage batteries 108, homes 112, solar panels 114, house batteries 116, and electric cars 118 can all be considered to be nodes within the power distribution network and the distribution lines 110 can be considered to be lines within the power distribution network. In combination, nodes and lines form a radial network. In many embodiments, node controllers are located at nodes throughout the network to control the operating parameters of different nodes to achieve OPF. Connected nodes can be nodes within the power distribution network that are connected by distribution and/or transmission lines and can be controlled by a node controller. The type of control utilized can depend on the specifics of the network and may include distributed, centralized, and/or hybrid power control. Although many different systems are described above with reference to FIG. 1, any of a variety of power distribution network including node controllers may be utilized to perform power distribution as appropriate to the requirements of specific applications in accordance with embodiments of the invention. Nodes utilizing node controllers connected to a communication network in accordance with various embodiments of the invention are discussed further below.

Node Controller Architectures

Figure 2:
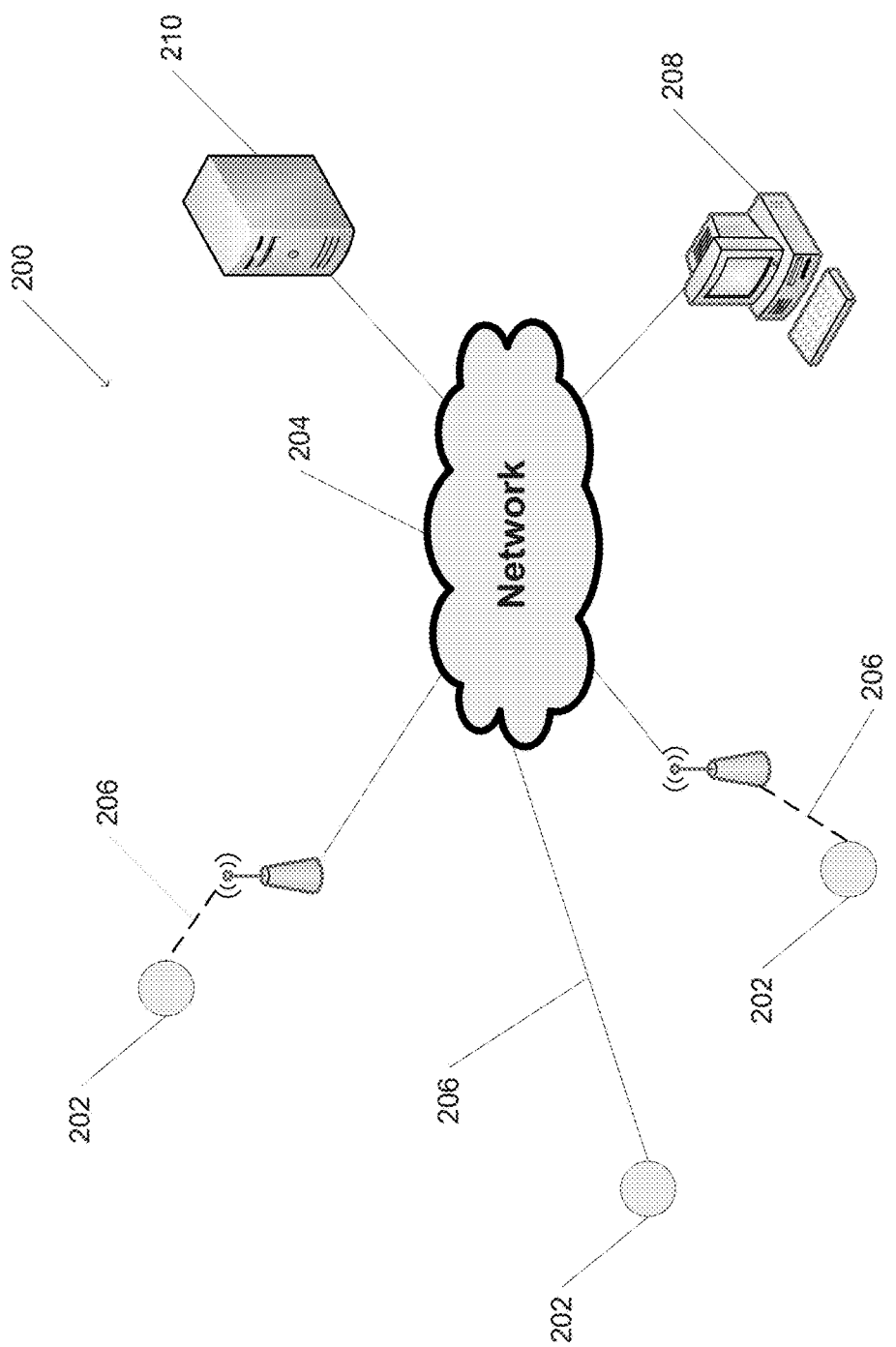
FIG. 2 is a diagram conceptually illustrating nodes utilizing node controllers connected to a communication network in accordance with an embodiment of the invention.

Nodes utilizing node controllers connected to a communication network n accordance with an embodiment of the invention are shown in FIG. 2. Nodes 202 can connect to communication network 204 using a wired and/or wireless connection 206, in some embodiments the power distribution network can act in place of the communication network. The communication network may also be connected to one or more centralized computer systems 208 to monitor calculations made by or to send instructions to multiple node controllers to, for example, control power distribution in the network at a global level. Additionally, in many embodiments a database management system 210 can be connected to the network to track node data which, for example, may be used to historically track power usage at various locations over time. Although various system configurations are described above with reference to FIG. 2, any number of systems can be utilized to achieve centralized control of nodes within a power distribution network as appropriate to the requirements of specific applications in accordance with embodiments of the invention. Coordinator controllers in accordance with various embodiments of the invention are discussed further below.

Coordinator Controllers

Figure 3:
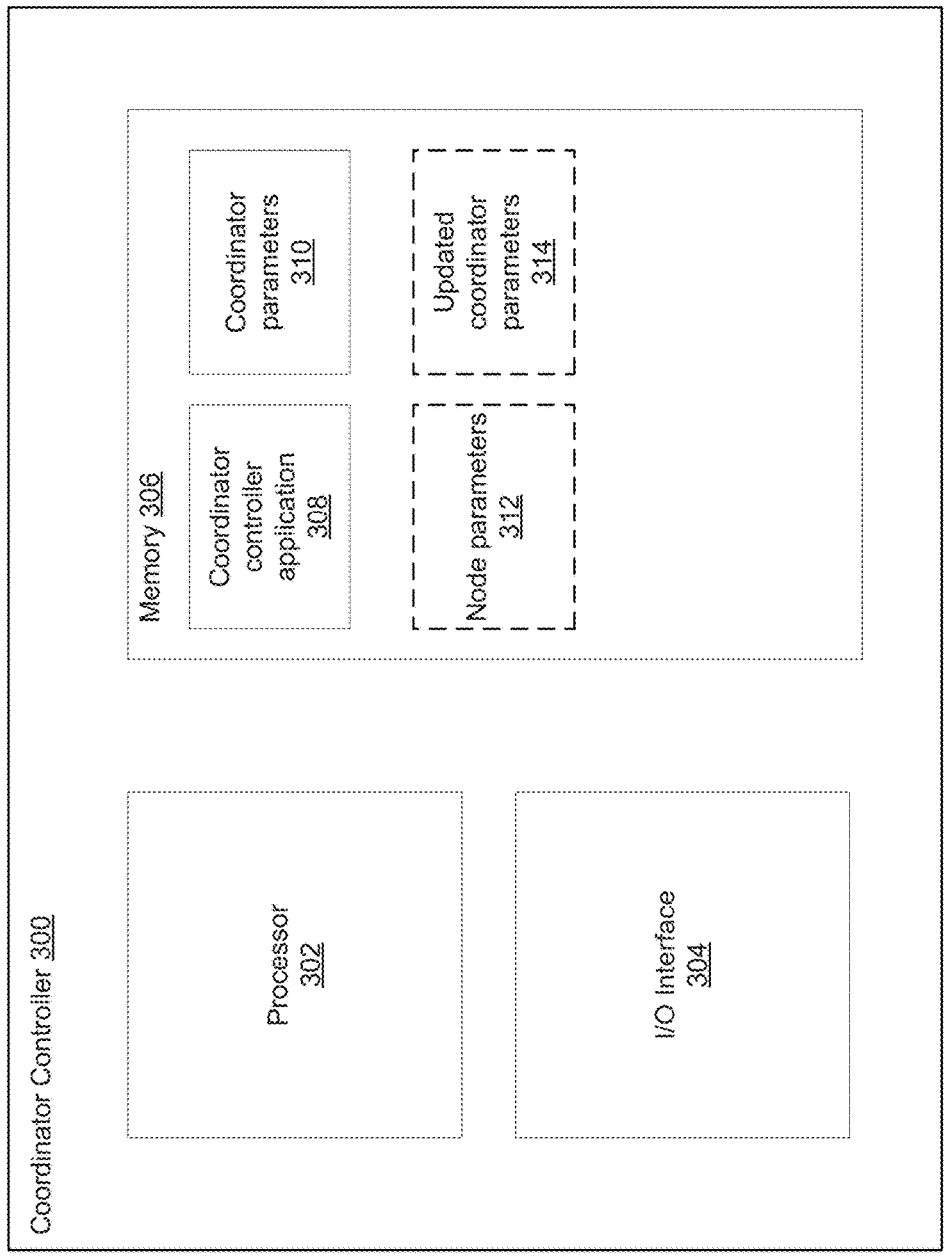
FIG. 3 is a block diagram illustrating a coordinator controller in accordance with an embodiment of the invention.

A coordinator controller in accordance with an embodiment of the invention is shown in FIG. 3. In many embodiments, coordinator controller 300 can perform calculations using one or more computer systems to determine coordinator parameters for nodes on a radial network. In the illustrated embodiment, the coordinator controller includes at least one processor 302, an I/O interface 304, and a memory 306. The at least one processor 302, when configured by software stored in memory, can perform calculations on and make changes to data passing through the I/O interface as well as data stored in memory. In many embodiments, the memory 306 includes software including a coordinator application 308, as well as coordinator parameters 301, node parameters 312, and updated coordinator parameters 314. The coordinator controller can calculate coordinator parameters for the power distribution network using node parameters it receives through the I/O interface from nodes in the network and/or from node controllers similar to node controllers described below with respect to FIG. 4. The coordinator application 308 will be discussed in greater detail below and can enable the coordinator controller to broadcast coordinator parameters to nodes to enable the power distribution network to solve for optimal power flow using a distributed gradient projection process. In several embodiments, coordinator parameters can enable nodes to act in a concurrent manner while node controllers solve for optimal power flow. It should be readily apparent that the coordinator controller can be at a node (for example at the root node) and/or at a centralized computer system in the power distribution network. Although a number of different coordinator controllers are described above with reference to FIG. 3, any of a variety of computing systems can be utilized to coordinate control of nodes in a power distribution system as appropriate to the requirements of specific applications in accordance with many embodiments of the invention. Node controllers in accordance with several embodiments of the invention are discussed further below.

Node Controllers

Figure 4:
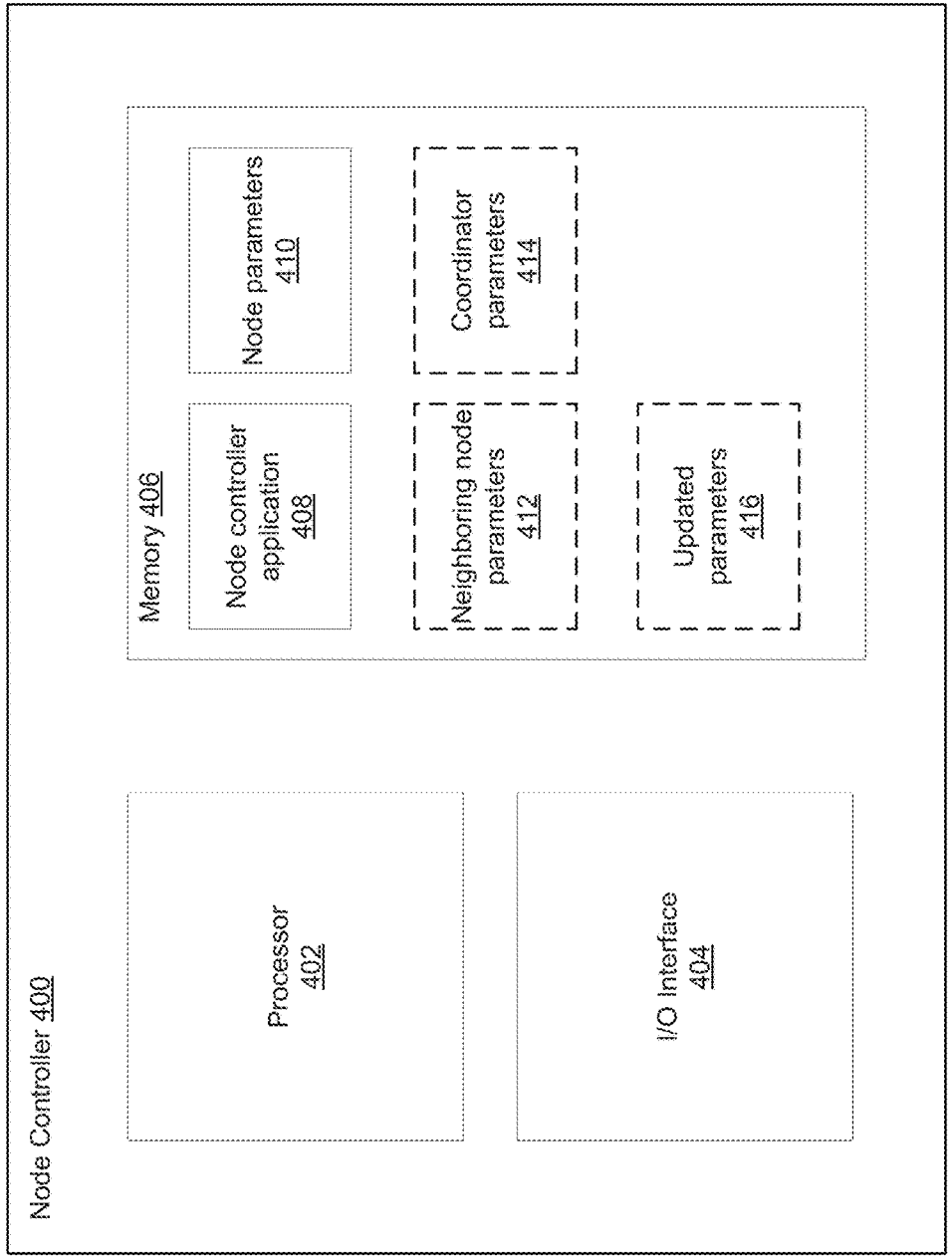
FIG. 4 is a block diagram illustrating a node controller in accordance with an embodiment of the invention.

A node controller in accordance with an embodiment of the invention is shown in FIG. 4. In various embodiments, node controller 400 can control the operating parameters of one or more nodes in a (radial) power distribution network. In the illustrated embodiment, the node controller includes at least one processor 402, an I/O interface 404, and memory

406. The at least one processor 402, when configured by software stored in memory can perform calculations on and make changes to data passing through the I/O interface as well as data stored in memory. In many embodiments, the memory 406 includes software including a node controller application 408 as well as node parameters 410, neighboring node parameters 412, coordinator parameters 414, and updated parameters 416. A node can calculate updated parameters by using a combination of its own node parameters, and/or neighboring node parameters received through the I/O interface from upstream and/or downstream nodes, and/or coordinator parameters received from a coordinator controller similar to a coordinator controller described above with reference to FIG. 2. The distributed optimal power flow application 408 will be discussed in greater detail below and can enable the node to perform calculations to solve for optimal power flow in a distributed manner. These distributed calculations performed on the node parameters can specifically involve a gradient projection process to solve for optimal power flow in a distributed manner. Various operating parameters of a node that can be controlled by a node controller are also discussed further below, and may include but are not limited to) power injection, current, resistance, impedance, and/or voltage. Although a number of different node controller implementations are described above with respect to FIG. 4, any of a variety of computing systems can be utilized to control a node within a power distribution system as appropriate to the requirements of specific applications in accordance with various embodiments of the invention. Radial networks in accordance with embodiments of the invention are discussed further below.

Radial Network Models

Figure 5:
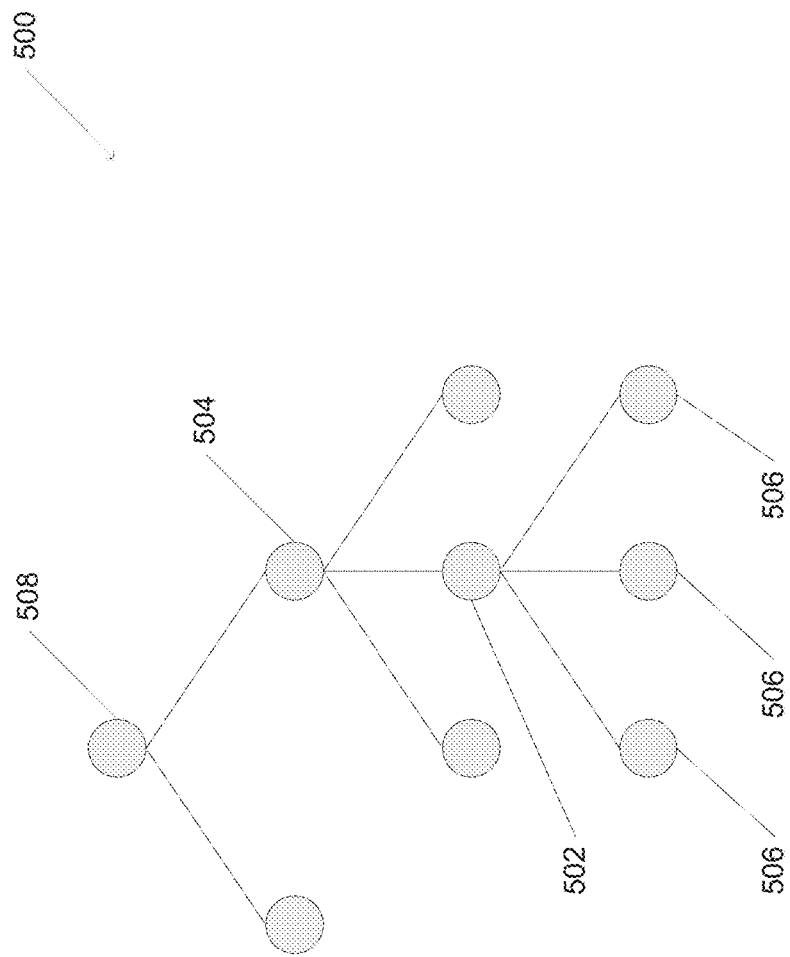
FIG. 5 is a diagram illustrating a radial network in accordance with an embodiment of the invention.

A radial network in accordance with an embodiment of the invention is shown in FIG. 5. In various embodiments, radial network 500 includes a node 502. Node 502 has an ancestor node 504 and one or more children nodes 506. Ancestor nodes are upstream from node 502. Children nodes are downstream from node 502. A radial network also has a unique root node 508. A detailed discussion of these nodes is provided further below. Although many radial networks are described above with reference to FIGS. 3 and 4, any of a variety of network configurations can be utilized as the network shape as appropriate to the requirements of specific applications in accordance with embodiments of the invention. The relationships between nodes and operation parameters in an OPF model are discussed further below.

Figure 6:
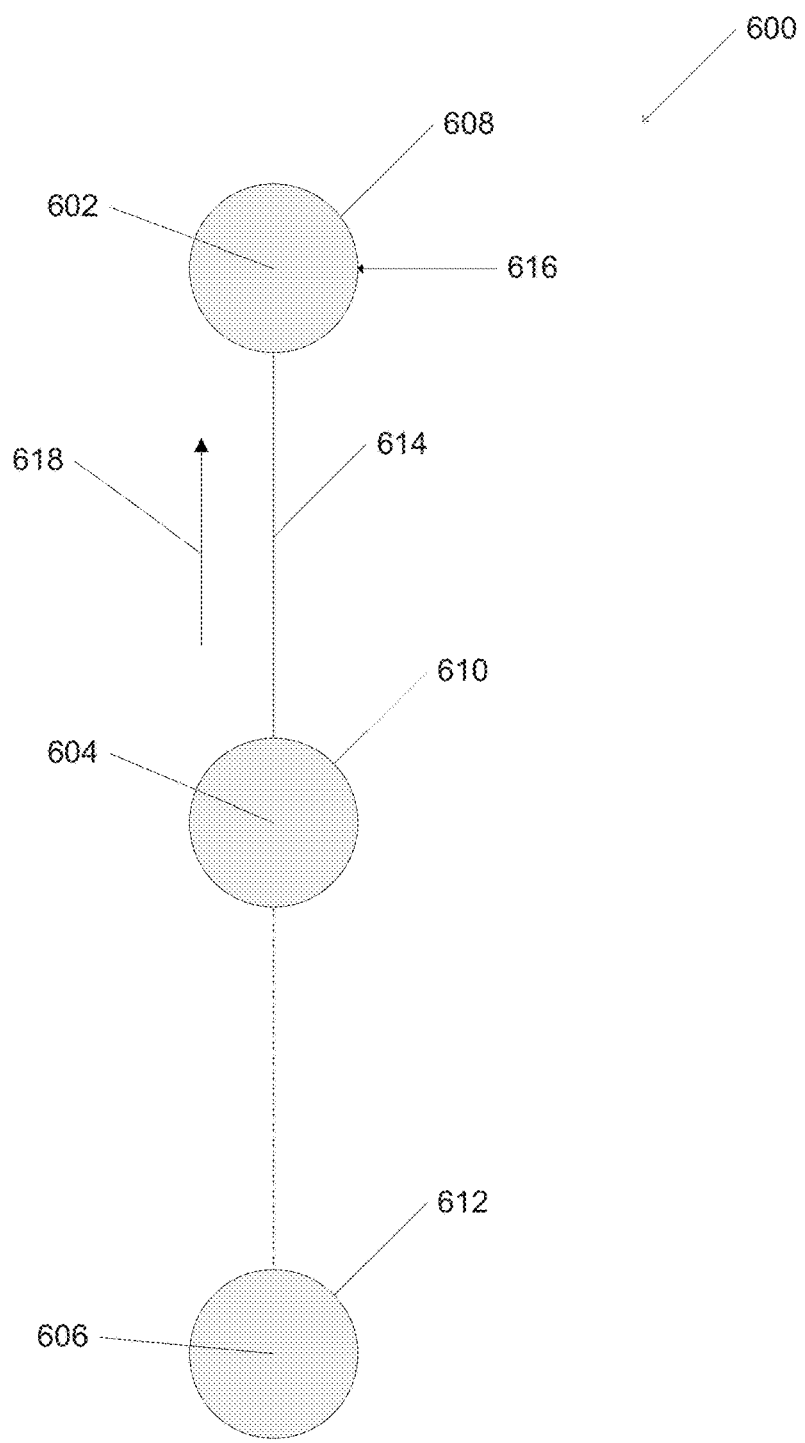
FIG. 6 is a diagram illustrating the relationship between nodes and operating parameters in accordance with an embodiment of the invention.

The relationship between nodes and operating parameters in an OPF model in accordance with an embodiment of the invention is shown in FIG. 6. A node 602 has a unique ancestor node 604. Node 602 and unique ancestor node 604 are connected by line 614 and have a unique root node 606. Both node 602 and unique ancestor node 604 have a series of operating parameters. In many embodiments of the invention, operating parameters for node 602 include voltage 608 and power injection 616. Unique ancestor node 608 has corresponding voltage 610 and unique root node has a corresponding voltage 612. The line 614 also has operating parameters which for example include an impedance value as well as a current and/or power injection 618. The relationship between nodes and operating values will be discussed in greater detail below. Although various node operating parameters are described above with respect to FIG. 6, any of a variety of operating parameters can be controlled to achieve OPF as appropriate to the requirements of specific applications in accordance with embodiments of the invention. The OPF problem is discussed further below.

OPF Problems

To highlight the main components of the distributed process without worrying about the complication of multiple phases (which will be discussed later below), the network will be assumed to be single-phase and radial. In particular, the node (bus) voltages $V_i$, node (bus) power injections $s_i$, and branch power flows $S_{ij}$ are scalars.

A distribution network can be modeled as the following: For each node (bus) $i \in N$, let $v_i = |V_i|^2$ denote the square of its complex voltage magnitude, e.g., if the voltage is $V_i = 1.05 \angle 120°$ per unit, then $v_i = 1.05^2$. Note that $v_0$ is fixed and given, $p_i = \text{Re}(s_i)$ and $q_i = \text{Im}(s_i)$ can denote the real and reactive power injections respectively. $\mathcal{P}_{i,i}$ can denote the unique path from node (bus) 0 to node (bus) i. Since the network is radial, the path $\mathcal{P}_{i,i}$ is well-defined. For each line $(i,j) \in \varepsilon$, let $l_{ij} = |I_{ij}|^2$ denote the square of the complex current magnitude, e.g., if the current is $I_{ij} = 0.5 \angle 10°$, then $l_{ij} = 0.5^2$. Let $P_{ij} = \text{Re}(S_{ij})$ and $Q_{ij} = \text{Im}(S_{ij})$ denote the real and reactive power flows respectively. Let $r_{ij} = \text{Re}(z_{ij})$ and $x_{ij} = \text{Im}(z_{ij})$ denote the resistance and impedance respectively.

In many embodiments, the following simplified statement of the OFF problem can be utilized:

$$\min \sum_{i=0}^{n} a_i p_i^2 + b_i p_i \quad (1a)$$

over $p_i$ and $q_i$ for $i \in \mathcal{N}^+$;

$p_0, q_0, v_i$ for $i \in \mathcal{N}^+$, $P_{ij}, Q_{ij}$ and $\ell_{ij}$ for $i \to j$;

s.t. (1b)

$$\sum_{i:i \to j}(P_{ij} - r_{ij}\ell_{ij}) + p_j = \sum_{k:j \to k} P_{jk},$$

$j \in \mathcal{N}$;

$$\sum_{i:i \to j}(Q_{ij} - x_{ij}\ell_{ij}) + q_j = \sum_{k:j \to k} = Q_{jk}, \quad (1c)$$

$j \in \mathcal{N}^+$;

$$v_i - v_j = 2(r_{ij}P_{ij} + x_{ij}Q_{ij}) - |z_{ij}|^2 \ell_{ij}, \quad (1d)$$

$i \to j$;

$$\ell_{ij} = \frac{P_{ij}^2 + Q_{ij}^2}{v_i}, \quad (1e)$$

$i \to j$;

$\underline{v}_i \le v_i \le \overline{v}_i, \quad (1f)$ $i \in \mathcal{N}^+$;

$p_i \in [\underline{p}_i, \overline{p}_i], \quad (1g)$ $q_i \in [\underline{q}_i, \overline{q}_i],$ $i \in \mathcal{N}^+.$ The objective function (1a) is assumed to be separable, quadratic, and purely a function of p. Equations (1b)(1e) describe the physical laws that govern the power flow. Equation (1f) is the voltage regulation constraints, and equation (1g) is the power injection constraints.

Basic and Derived Variables

Given the substation voltage $v_0$ and the branch node (bus) power injections $s_i$ for $i \in \mathcal{N}^+$, there exists a unique practical power flow solution $([v_i]_{i \in \mathcal{N}}, [l_{ij}]_{i \to j}, [S_{ij}]_{i \to j}, s_0)$. Hence, the optimization variables can be classified into two categories: (1) Basic variables that are controllable. These variables include the branch node (bus) real and reactive power injections $p_i$ and $q_i$ for $i \in \mathcal{N}^{30}$. (2) Derived variables that are uniquely determined by power flow equations (1b)-(1e) after specifying the basic variables. These variables include the substation power injection $p_0$, $q_0$, the branch node (bus) voltages $v_i$ for $i \in \mathcal{N}^+$, and line flows $P_{ij}$, $Q_{ij}$, $l_{ij}$ for $i \to j$.

In some embodiments, $x = (p_1, \ldots, p_n, q_1, \ldots, q_n)$ can denote all basic variables. Then derived variables can be functions of x, i.e., $p_0 = p_0(x)$, $q_0 = q_0(x)$;

$v_i = v_i(x)$, $i \in \mathcal{N}^+$;

$P_{ij} = P_{ij}(x)$, $Q_{ij} = Q_{ij}(x)$, $l_{ij} = l_{ij}(x)$, $i \to j$.

Removing the derived variables can transform the statement of the OFF problem (1) into the following form:

$$\min \; a_0 p_0^2(x) + b_0 p_0(x) + \sum_{i=1}^{n} (a_i p_i^2 + b_i p_i) \quad (2a)$$

over $x$ s.t. $\underline{v}_i \leq v_i(x) \leq \overline{v}_i, \quad i \in \mathcal{N}^+$;

$$\underline{p}_i \leq p_i \leq \overline{p}_i, \; \underline{q}_i \leq q_i \leq \overline{q}_i, \quad i \in \mathcal{N}^+. \quad (2b)$$

While (2) is equivalent to (1) for radial networks, (2) has much fewer optimization variables than (1) and in various embodiments can be more efficient to compute. Furthermore, the derived variables ($p_0$, $[v_i]_{i \in \mathcal{N}^+}$) will be automatically computed by power flow physics once the basic variable x is computed. This motivates an iterative procedure for solving OPF: in each iteration, first update the basic variable x and then let the derived variables be automatically computed by computations based upon power flow physics.

Gradient Projection Processes

Figure 7:
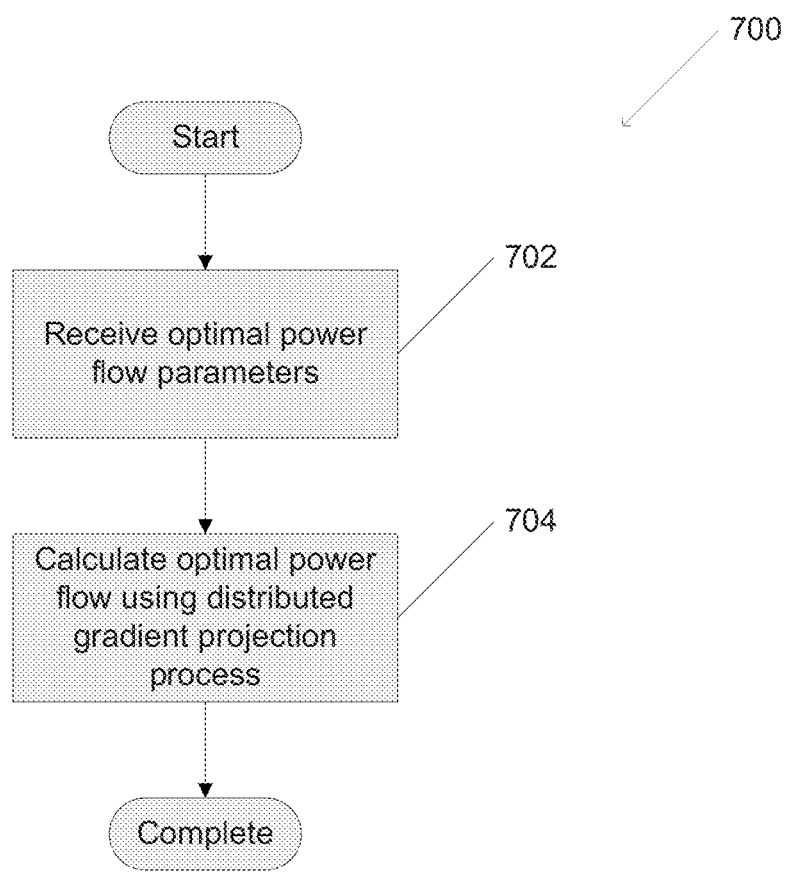
FIG. 7 is a flow chart illustrating a process for solving for optimal power flow in a radial network in accordance with an embodiment of the invention.

A process for achieving optimal power flow is illustrated in FIG. 7. The process 700 includes receiving 702 optimal power flow parameters at one or more nodes and/or one or more coordinators. Optimal power how can then be calculated 704 using a gradient projection process. The calculations for gradient projection will be discussed in detail further below. In various embodiments, gradient projection includes calculating derivatives and/or choosing a step size for updating optimization parameters. Although a number of processes for achieving optimal power flow are described with reference to FIG. 7 any of a variety of gradient projection processes can be utilized to solve for optimal power flow as appropriate to the requirements of specific applications in accordance with embodiments of the invention. Gradient decent processes in accordance with embodiments of the invention are described further below.

Figure 8:
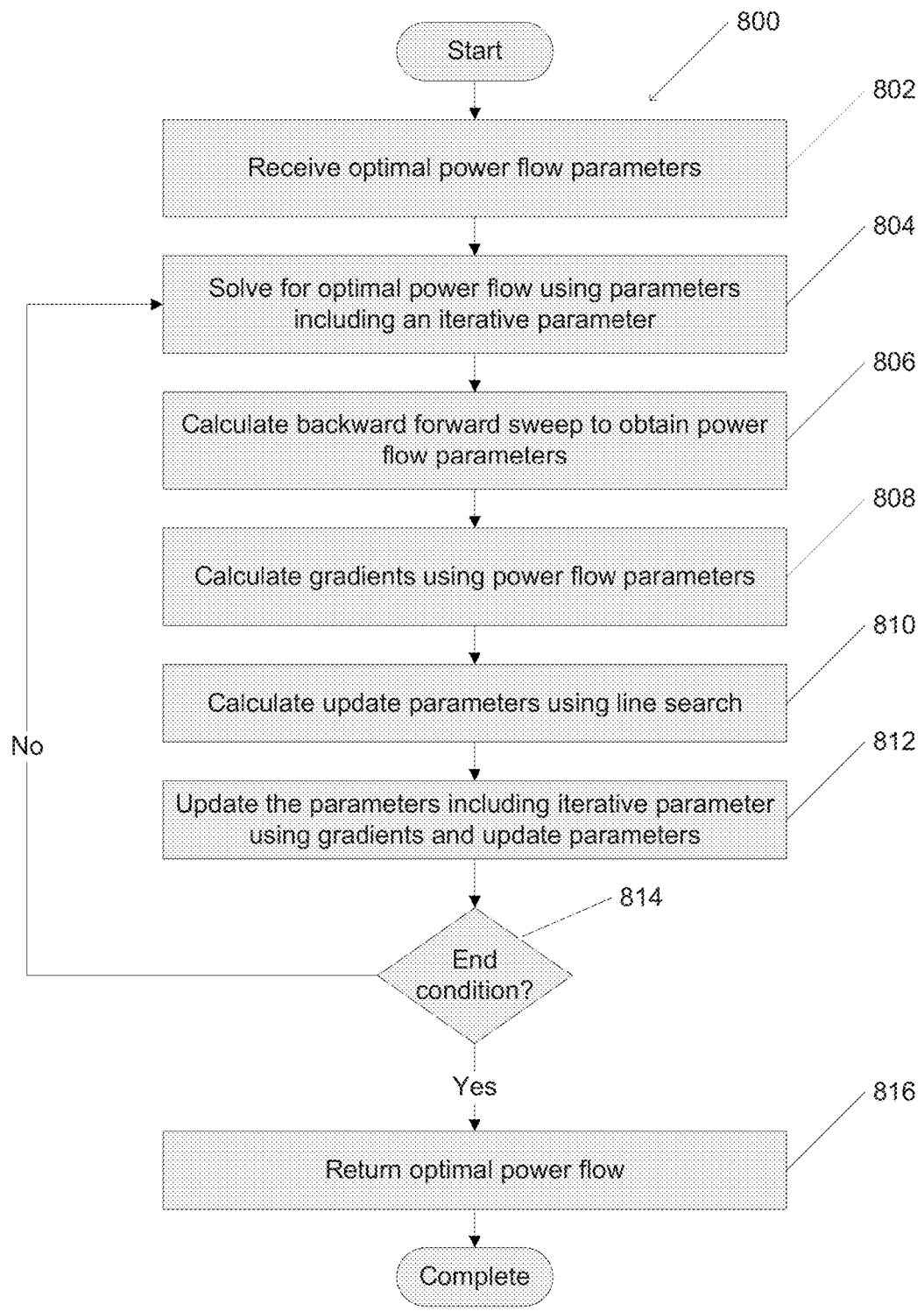
FIG. 8 is a flow chart illustrating a process to solve for optimal power flow utilizing a gradient projection solution in accordance with an embodiment of the invention.

A process to solve for optimal power flow utilizing a gradient projection solution is illustrated in FIG. 8. The process 800 includes receiving 802 optimal power flow parameters. Parameters including, an iterative parameter are used to solve 804 for optimal power flow. A backwards forwards sweep can be calculated 806 to obtain power flow parameters. A backwards forwards sweep will be discussed in detail further below. Gradients are calculated 808 using, power flow parameters. Gradient calculations can be exact and/or approximations, and various ways to calculate gradients including in distributed processes will be described further below. Update parameters can be calculated 810 using a line search 810. Parameters including the iterative parameter are updated 812 using gradients and update parameters. In various embodiments, some or all of these updated parameter values can come from a coordinator. End conditions are checked 814. If an end condition 814 has not been reached, the parameters including the iterative parameter are used to once again solve 804 for optimal power flow. If an end condition 814 has been reached, optimal power flow is returned 816 and the process completes. Although a variety of processes for gradient descent are illustrated with respect to FIG. 8, any of a variety of processes to iteratively calculate optimal power flow in a power distribution network can be utilized as appropriate to the requirements of specific applications in accordance with embodiments of the invention.

The process proposed to solve the OPF problem (2) is a gradient projection process. In each iteration of the process, derivatives of the modified objective function with respect to the basic variables are estimated, and then used as the negative direction of updating the basic variables. Line search is implemented to determine the step sizes of basic variable updates so as to ensure the convergence of the process.

Exact Derivatives

One of the reasons that the gradient projection process proposed can be adept is that the derivatives can be estimated efficiently. First a process for exactly computing derivatives will be illustrated. A process for estimating derivatives will be described further below.

As noted above, gradients computed during OPF calculations can be computed exactly. Since the network is radial, (1b)-(1e) imply $$\partial_x P_{ij} = r_{ij} \partial_x \ell_{ij} - \partial_x p_j + \sum_{k: j \to k} \partial_x P_{jk},$$

$$\partial_x Q_{ij} = x_{ij} \partial_x \ell_{ij} - \partial_x q_j + \sum_{k: j \to k} \partial_x Q_{jk},$$

$$\partial_x v_j = \partial_x v_i - 2(r_{ij} \partial_x P_{ij} + x_{ij} \partial_x Q_{ij}) + |z_{ij}|^2 \partial_x \ell_{ij},$$

$$\partial_x \ell_{ij} = \frac{2P_{ij}}{v_i} \partial_x P_{ij} + \frac{2Q_{ij}}{v_i} \partial_x Q_{ij} - \frac{\ell_{ij}}{v_i} \partial_x v_i$$

for $i \to j$. I can denote the 2×2 identity matrix and $\partial_x l_{ij}$ can be removed to obtain $$\left[ I - \frac{2}{v_i} \binom{r_{ij}}{x_{ij}} (P_{ij} \; Q_{ij}) \right] \binom{\partial_x P_{ij}}{\partial_x Q_{ij}} =$$

$$\sum_{k: j \to k} \binom{\partial_x P_{jk}}{\partial_x Q_{jk}} - \binom{\partial_x p_j}{\partial_x q_j} - \binom{r_{ij}}{x_{ij}} \frac{\ell_{ij}}{v_i} \partial_x v_i,$$

$$\partial_x v_j = \left(1 - |z_{ij}|^2 \frac{\ell_{ij}}{v_i}\right) \partial_x v_i - 2\left(r_{ij} - |z_{ij}|^2 \frac{P_{ij}}{v_i}\right) \partial_x P_{ij} - 2\left(x_{ij} - |z_{ij}|^2 \frac{Q_{ij}}{v_i}\right) \partial_x Q_{ij}$$

for $i \to j$. Pseudocode that can be utilized to solve for optimal power flow utilizing a gradient calculation process to perform an exact derivative calculation in accordance with many embodiments of the invention is illustrated in FIG. 9.

Figure 9:
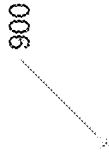
FIG. 9 is pseudocode illustrating a gradient calculation process utilized in a gradient projection process for solving for optimal power flow in accordance with an embodiment of the invention.

Hence, the gradients $\partial_x(P, Q, v, p_0, q_0)$ can be computed by a process similar to process 1 as illustrated in FIG. 9.

Approximated Derivatives

To avoid the iterative procedure used in process 1 described above and improve computational efficiency, the gradients can be estimated as follows. Note that since the current terms in (1b)-(1d) are much smaller than the other terms in practice, (P, Q, v) can be estimated by $(\hat{P}, \hat{Q}, \hat{v})$ defined as $$\sum_{i:i \to j} \hat{P}_{ij} + p_j = \sum_{k:j \to k} \hat{P}_{jk},$$
$$j \in \mathcal{N};$$
$$\sum_{i:i \to j} \hat{Q}_{ij} + q_j = \sum_{k:j \to k} \hat{Q}_{jk},$$
$$j \in \mathcal{N};$$
$$\hat{v}_i - \hat{v}_j = 2(r_{ij}\hat{P}_{ij} + x_{ij}\hat{Q}_{ij}),$$
$$i \to j.$$

Note that the equations are linear and in many embodiments straightforward to obtain $$\partial_x \hat{P}_{ij} = \sum_{k:j \to k} \partial_x \hat{P}_{jk} - \partial_x p_j,$$
$$i \to j;$$
$$\partial_x \hat{Q}_{ij} = \sum_{k:j \to k} \partial_x \hat{Q}_{jk} - \partial_x q_j,$$
$$i \to j;$$
$$\partial_x \hat{v}_j = \partial_x \hat{v}_i - 2r_{ij}\partial_x \hat{P}_{ij} - 2x_{ij}\partial_x \hat{Q}_{ij},$$
$$i \to j.$$

In several embodiments $i \wedge j$ can denote the joint of node (bus) i and j for i, $j \in \mathcal{N}$, and $R_i$ can denote the total resistance from node (bus) 0 to node (bus) i for $i \in \mathcal{N}$. Then $\partial_x(\hat{P}, \hat{Q}, \hat{v})$ has the following closed-form expression:

$$\partial_{p_k}\hat{P}_{ij} = -\mathbb{1}_{j \in \mathcal{P}_k}, \partial_{q_k}\hat{P}_{ij} = 0, k=1,2,\ldots n, i \to j; \quad (3a)$$

$$\partial_{p_k}\hat{Q}_{ij} = 0, \partial_{q_k}\hat{Q}_{ij} = -\mathbb{1}_{j \in \mathcal{P}_k}, k=1,2,\ldots n, i \to j; \quad (3b)$$

$$\partial_{p_k}v_i = 2R_{i \wedge k}, \partial_{q_k}v_i = 2X_{i \wedge k}, k=1,2,\ldots n, i \to j; \quad (3c)$$

$\partial_x(P, Q, v)$ can be approximated by $\partial_x(\hat{P}, \hat{Q}, \hat{v})$, i.e., $$\partial_x(P,Q,v) \approx \partial_x(\hat{P},\hat{Q},\hat{v}).$$

Note that $\partial_x(\hat{P}, \hat{Q}, \hat{v})$ is a constant that does not depend on (P, Q, v), and therefore can be computed once ahead of time.

Finally, $\partial_x(p_0, q_0)$ can be approximated as follows, (1b) can be summed up for $j \in \mathcal{N}$ to obtain $$\sum_{i=0}^{n} p_i = \sum_{i \to j} r_{ij}\ell_{ij} = \sum_{i \to j} r_{ij}\frac{P_{ij}^2 + Q_{ij}^2}{v_i}.$$

Hence, $$\partial_{p_i} p_0 = -1 + \sum_{k \to l} r_{kl}\partial_{p_i}\left(\frac{P_{kl}^2 + Q_{kl}^2}{v_k}\right)$$
$$= -1 + \sum_{k \to l} r_{kl}\left(\frac{2P_{kl}}{v_k}\partial_{p_i}P_{kl} + \frac{2Q_{kl}}{v_k}\partial_{p_i}Q_{kl} - \frac{\ell_{kl}}{v_k}\partial_{p_i}v_k\right)$$
$$\approx -1 + \sum_{k \to l} r_{kl}\left(\frac{2P_{kl}}{v_k}\partial_{p_i}\hat{P}_{kl} + \frac{2Q_{kl}}{v_k}\partial_{p_i}\hat{Q}_{kl} - \frac{\ell_{kl}}{v_k}\partial_{p_i}\hat{v}_k\right)$$

$$\partial_{q_i} p_0 = \sum_{k \to l} r_{kl}\partial_{q_i}\left(\frac{P_{kl}^2 + Q_{kl}^2}{v_k}\right)$$
$$= \sum_{k \to l} r_{kl}\left(\frac{2P_{kl}}{v_k}\partial_{q_i}P_{kl} + \frac{2Q_{kl}}{v_k}\partial_{q_i}Q_{kl} - \frac{\ell_{kl}}{v_k}\partial_{q_i}v_k\right)$$
$$\approx \sum_{k \to l} r_{kl}\left(\frac{2P_{kl}}{v_k}\partial_{q_i}\hat{P}_{kl} + \frac{2Q_{kl}}{v_k}\partial_{q_i}\hat{Q}_{kl} - \frac{\ell_{kl}}{v_k}\partial_{q_i}\hat{v}_k\right)$$

for $i = 1, 2, \ldots, n$.

Modified Objective Functions

To enable a distributed process, i.e., each node (bus) i updates its own $(p_i, q_i)$ locally, the constraints of OFF can be decoupled, i.e., constraints of the form (2b) are easy to handle while constraints of the form (2a) should be avoided.

To avoid coupled constraints (2a), a log-barrier function can be added to the objective as $$L(x; \mu) = a_0 p_0^2(x) + b_0 p_0(x) + \sum_{i=1}^{n}(a_i p_i^2 + b_i p_i) - \underline{\mu}\sum_{i=1}^{n}\ln(\overline{v}_i - \underline{v}_i) - \overline{\mu}\sum_{i=1}^{n}\ln(\overline{v}_i - v_i(x))$$

where $\mu = (\underline{\mu}, \overline{\mu}) > 0$ component wise. Note that $\underline{v}_i \leq v_i(x) \leq \overline{v}_i$ for $i \in \mathcal{N}^+$ is enforced since $$\lim_{t \downarrow \underline{v}_i} -\underline{\mu}\ln(t - \underline{v}_i) = \infty,$$
$$\lim_{t \uparrow \overline{v}_i} -\overline{\mu}\ln(\overline{v}_i - t) = \infty,$$
$$i \in \mathcal{N}^+$$

and OPF seeks to minimize L. Besides, $$\lim_{\mu \downarrow 0} L(x; \mu) = a_0 p_0^2(x) + b_0 p_0(x) + \sum_{i=1}^{n}(a_i p_i^2 + b_i p_i)$$

and therefore solving OPF is similar to minimize $L(x; \mu)$ with small enough $\mu$.

To summarize, in various embodiments the distributed process can solve $OPF(\mu)$: min $L(x; \mu)$ over $p_1, \ldots, p_n, q_1, \ldots, q_n$;

s.t. $\underline{p}_i \leq p_i \leq \overline{p}_i, \underline{q}_i \leq q_i \leq \overline{q}_i, i=1, 2, \ldots, n$ for a decreasing sequence of $\mu$. $OPF(\mu)$ will be solved for a specific $\mu$ below.

Gradient Projection

In many embodiments, there are two key steps in a gradient projection process: 1) compute or approximate) the gradients; and 2) choose a step size to update the optimization variables.

The gradients can be approximated using (3). In particular, $$\partial_{p_i} L = (2a_0 p_0 + b_0)\partial_{p_i} p_0 + (2a_i p_i + b_i) - \sum_{k=1}^{n}\left[\frac{\mu}{v_k - \underline{v}_k} + \frac{\overline{\mu}}{v_k - \overline{v}_k}\right] \quad (4)$$

$$\partial_{p_i} v_k$$

$$= (2a_0 p_0 + b_0)\left[-1 + \sum_{k\to l} r_{kl}\left(\frac{2P_{kl}}{v_k}\partial_{p_i} P_{kl} + \frac{2Q_{kl}}{v_k}\partial_{p_i} Q_{kl} - \frac{\ell_{kl}}{v_k}\partial_{p_i} v_k\right)\right] +$$

$$(2a_i p_i + b_i) - \sum_{k=1}^{n}\left[\frac{\mu}{v_k - \underline{v}_k} + \frac{\overline{\mu}}{v_k - \overline{v}_k}\right]\partial_{p_i} v_k$$

$$\approx (2a_0 p_0 + b_0)\left[-1 + \sum_{k\to l} r_{kl}\left(\frac{2P_{kl}}{v_k}\partial_{p_i} \hat{P}_{kl} + \frac{2Q_{kl}}{v_k}\partial_{p_i} \hat{Q}_{kl} - \frac{\ell_{kl}}{v_k}\partial_{p_i} \hat{v}_k\right)\right] + (2a_i p_i + b_i) - \sum_{k=1}^{n}\left[\frac{\mu}{v_k - \underline{v}_k} + \frac{\overline{\mu}}{v_k - \overline{v}_k}\right]\partial_{p_i} \hat{v}_k$$

$$= -(2a_0 p_0 + b_0)\left[1 + \sum_{k\to l} r_{kl}\left(\frac{2P_{kl}}{v_k}\mathbb{1}_{l\in\mathcal{P}_i} + \frac{2\ell_{kl}}{v_k}R_{i\wedge k}\right)\right] +$$

$$(2a_i p_i + b_i) - \sum_{k=1}^{n}\left[\frac{\mu}{v_k - \underline{v}_k} + \frac{\overline{\mu}}{v_k - \overline{v}_k}\right]2R_{i\wedge k}$$

for $i = 1, 2, \ldots, n$.
Similarly, $$\partial_{q_i} L \approx -(2a_0 p_0 + b_0)\sum_{k\to l} r_{kl}\left(\frac{2Q_{kl}}{v_k}\mathbb{1}_{l\in\mathcal{P}_i} + \frac{2\ell_{kl}}{v_k}X_{i\wedge k}\right) - \quad (5)$$

$$\sum_{k=1}^{n}\left[\frac{\mu}{v_k - \underline{v}_k} + \frac{\overline{\mu}}{v_k - \overline{v}_k}\right]2X_{i\wedge k}$$

for $i = 1, 2, \ldots, n$.

The step size can be determined by doing a line search along the direction of $-\partial_{(p,q)}L$, i.e., back off the step size until the modified Objective function can be well-approximated by its linearization around the current solution point. Three parameters α (determine the back off speed, set to 0.5 in the current implementation), β (criteria for the linearization of the objective to be accurate enough, set to 0.5 in the current implementation), and ε (criteria for the progress to be too slow, set to 1e-4 in the current implementation) are needed in the line search step. Pseudocode that can be utilized to implement line search processes utilized for solving for optimal power flow by node controllers to achieve gradient descent in accordance with many embodiments of the invention is illustrated in process 2 in FIG. 10.

The introduction of ε in the "if" branch in Step 7) of process 2 illustrated in FIG. 10 is to stop the iterations when progress gets too slow, i.e., $\|\Delta p\|+\|\Delta q\|\leq\varepsilon$. When this happens, stopFlag is set to 1 and iterations are stopped. Otherwise, a large number of iterations will run without updating (p,q) significantly.

With the "if" branch in Step 7) of process 2 illustrated in FIG. 10, it is possible that $L(p',q')>L(p,q)$. In this case, (p',q') is set to (p,q) to ensure that new point (p',q') does not have a larger objective value than (p,q).

In many embodiments, a point (p,q) is a local optimum for minimizing L if $$\langle \partial_{p_i}L, \tilde{p}_i - p_i \rangle \geq 0, \; \forall \tilde{p}_i \in (\underline{p}_i, \overline{p}_i), \; \forall i \in \mathcal{N}^+;$$

$$\langle \partial_{q_i}L, \tilde{q}_i - q_i \rangle \geq 0, \; \forall \tilde{q}_i \in (\underline{q}_i, \overline{q}_i), \; \forall i \in \mathcal{N}^+.$$

It can be proven that if (p,q)=(p',q'), then (p,q) is a local optimum. Additionally, it can be proven that if ε=0, then the input (p,q) and output (p',q') of process 2 satisfy $$L(p',q') \leq L(p,q).$$

if and only if (p',q')=(p,q). These imply that L(p',q')<L(p,q) unless (p,q) is a local optimum, in which case (p',q')=(p,q).

Distributed Gradient Projection Processes

Pseudocode that can be utilized to implement distributed gradient projection processes utilized to solve for optimal power flow in accordance with various embodiments of the invention is illustrated in FIG. 11. The distributed gradient projection process is summarized in process 3 illustrated in FIG. 11, which solves OPF(μ) with different values of μ. In particular, $\mu_1, \mu_2, \ldots, \mu_K$ can denote a sequence of μ that approaches 0 and x=(p,q). Given a feasible initial point $x^{(0)}$, process 3 solves $OPF(\mu_1)$ with initial point $x^{(0)}$ to obtain $x^{(1)}$, then solves $OPF(\mu_2)$ with initial point $x^{(1)}$ to obtain $x^{(2)}, \ldots$, and finally solves $OPF(\mu_K)$ with initial point $x^{(K-1)}$ to obtain the final output solution $x^{(K)}$.

To solve each OPF(μ), process 3 repeatedly calculates the gradient $\partial_x L(x;\mu)$ and does a line search along the direction of $-\partial_x L$ to update x, until stopFlag=1, which indicates numerically no further improvements can be made. It can be proven that a local minimum of L(x;μ) is obtained in each inner loop of process 3.

Distributed Implementation

An important advantage of process 3 is that it can be implemented in a distributed way. The infrastructure required to implement process 3 in a distributed way is described as follows. (1) There is a node controller (agent) at each branch node (bus) $i \in \mathcal{N}^+$, and that there is a centralized coordinator at the substation node (bus) 0. (2) Each node controller (agent) i has access to its local power injection $(p_i, q_i)$, local power flow $(P_{ij}, Q_{ij})$, and local voltage $v_i$. It can directly communicate with its neighbors, i.e., node controller (agent) i can communicate with node controller (agent) j if and only if i~j. (3) The centralized coordinator has access to the substation power injection $(p_0, q_0)$ and can communicate with all node controllers (agents) in the network.

In various embodiments, to implement process 3 in a distributed way, only nodes (buses) i whose power injections $(p_i, q_i)$ can be controlled need to have node controllers (agents). For example, if $\underline{p}_i = \overline{p}_i$ and $\underline{q}_i = \overline{q}_i$, then node (bus) i does not need to have a node controller (agent).

There are two key components in the distributed implementation of process 3: 1) compute gradient $\partial_{(p,q)}L(p^*,q^*;\mu)$ in a distributed way; and 2) run line search (process 2 in a distributed way.

Distributed Gradient Computation

The approximated gradients (see equations (4)-(5)) can be computed in a backward forward sweep fashion as described below.

In several embodiments. Down(i):=$\{j \in \mathcal{N} | i \in \mathcal{P}_j\}$ can denote the downstream nodes (buses) of node (bus) $i \in \mathcal{N}$. Define $$c_i = \sum_{k=1}^{n} 2R_{i\wedge k}\left(\frac{\mu}{v_k - \underline{v}_k} + \frac{\overline{\mu}}{v_k - \overline{v}_k}\right), i \in \mathcal{N};$$

$$d_i = \sum_{k=1}^{n} 2X_{i\wedge k}\left(\frac{\mu}{v_k - \underline{v}_k} + \frac{\overline{\mu}}{v_k - \overline{v}_k}\right), i \in \mathcal{N};$$

$$e_i = \sum_{k \to l} r_{kl}\left(\frac{2P_{kl}}{v_k}\mathbb{1}_{l \in \mathcal{P}_i} + \frac{\ell_{kl}}{v_k}2R_{i\wedge k}\right), i \in \mathcal{N};$$

$$f_i = \sum_{k \to l} r_{kl}\left(\frac{2Q_{kl}}{v_k}\mathbb{1}_{l \in \mathcal{P}_i} + \frac{\ell_{kl}}{v_k}2X_{i\wedge k}\right), i \in \mathcal{N}.$$

Then the approximated gradients (4)-(5) can be simplified as $$\partial_{p_i} L = -(2a_0 p_0 + b_0)(1 + e_i) + (2a_i p_i + b_i) - c_i, \ i \in \mathcal{N}^+; \quad (6a)$$

$$\partial_{q_i} L = -(2a_0 p_0 + b_0) f_i - d_i, \ i \in \mathcal{N}^+. \quad (6b)$$

The centralized coordinator has access to $p_0$ can broadcast $2\alpha_0 p_0 + b_0$ to all branch nodes (buses). Each node controller (agent) i knows $p_i$ and can easily compute $2\alpha_i p_i + b_i$. Hence, the main challenge is to compute $c_i$, $d_i$, $e_i$, $f_i$ in a distributed manner.

The quantities $c_i$, $d_i$, $e_i$, $f_i$ can be computed recursively. To derive the recursive equations, note that for each i→j, one has $$R_{i\wedge k} - R_{j\wedge k} = -r_{ij}\mathbb{1}_{k \in Down(j)}$$

and therefore $$c_i - c_j = \sum_{k=1}^{n} 2(R_{i\wedge k} - R_{j\wedge k})\left(\frac{\mu}{v_k - \underline{v}_k} + \frac{\overline{\mu}}{v_k - \overline{v}_k}\right)$$

$$= -\sum_{k=1}^{n} 2r_{ij}\mathbb{1}_{k \in Down(j)}\left(\frac{\mu}{v_k - \underline{v}_k} + \frac{\overline{\mu}}{v_k - \overline{v}_k}\right)$$

$$= -2r_{ij}\sum_{k \in Down(j)}\left(\frac{\mu}{v_k - \underline{v}_k} + \frac{\overline{\mu}}{v_k - \overline{v}_k}\right).$$

Similarly, $$d_i - d_j = -2x_{ij}\sum_{k \in Down(j)}\left(\frac{\mu}{v_k - \underline{v}_k} + \frac{\overline{\mu}}{v_k - \overline{v}_k}\right).$$

Besides, $$\mathbb{1}_{l \in \mathcal{P}_j} - \mathbb{1}_{l \in \mathcal{P}_j} = \mathbb{1}$$

and therefore $$e_i - e_j = \sum_{k \to l} r_{kl}\left[\frac{2P_{kl}}{v_k}(\mathbb{1}_{l \in \mathcal{P}_i} - \mathbb{1}_{l \in \mathcal{P}_j}) + \frac{\ell_{kl}}{v_k}2(R_{i\wedge k} - R_{j\wedge k})\right]$$

$$= -\sum_{k \to l} r_{kl}\left[\frac{2P_{kl}}{v_k}\mathbb{1}_{l=j} + \frac{\ell_{kl}}{v_k}2r_{ij}\mathbb{1}_{k \in Down(j)}\right]$$

$$= -\frac{2r_{ij}P_{ij}}{v_i} - r_{ij}\sum_{k \in Down(j)}\frac{2r_{kl}\ell_{kl}}{v_k}.$$

Similarly, $$f_i - f_j = -\frac{2r_{ij}Q_{ij}}{v_i} - x_{ij}\sum_{k \in Down(j)}\frac{2r_{kl}\ell_{kl}}{v_k}.$$

Hence, $g_i$ and $h_i$ can be defined as:

$$g_i = \sum_{k \in Down(i)}\left(\frac{\mu}{v_k - \underline{v}_k} + \frac{\overline{\mu}}{v_k - \overline{v}_k}\right),$$

$$i \in \mathcal{N}^+;$$

$$h_i = \sum_{k \in Down(i)}\frac{2r_{kl}\ell_{kl}}{v_k},$$

$$i \in \mathcal{N}^+,$$

then $c_i$, $d_i$, $e_i$, $f_i$ can be computed recursively as $$c_j = c_i + 2r_{ij}g_j, \quad (7a)$$
$$i \to j;$$

$$d_j = d_i + 2x_{ij}g_j, \quad (7b)$$
$$i \to j;$$

$$e_j = e_i + \frac{2r_{ij}P_{ij}}{v_i} + r_{ij}h_j, \quad (7c)$$
$$i \to j;$$

$$f_j = f_i + \frac{2r_{ij}Q_{ij}}{v_i} + x_{ij}h_j, \quad (7d)$$
$$i \to j.$$

Distributed Gradient Projection Processes

Figure 13:
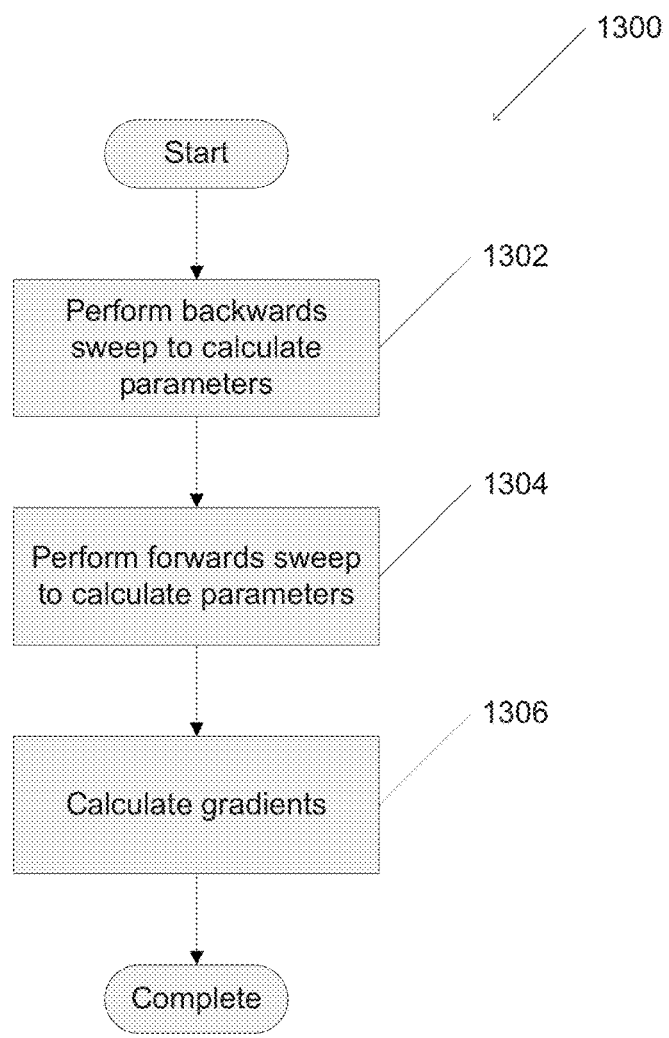
FIG. 13 is a flow chart illustrating a distributed gradient process utilized in solving for optimal power flow in accordance with an embodiment of the invention.

A distributed gradient process utilized in solving for optimal power flow to implement distributed gradient projection is illustrated in FIG. 13. The process 1300 includes performing 1302 a backwards sweep to calculate parameters utilized in OPF calculations. Additionally, a forwards sweep is performed to calculate parameters. Various distributed backwards and forwards sweep processes are described in detail below with reference to FIGS. 14A and 14B. Gradients are calculated 1306. Gradients can be calculated with exact derivative calculations and/or with approximations as described above. Pseudocode to implement a distributed gradient projection process similar to process 1300 is described further below in FIG. 15. Although a variety of gradient projection processes are described above with respect to FIG. 13, any of a variety of distributed gradient projection processes to solve for optimal power flow in a power distribution network can be utilized as appropriate to the requirements of specific applications in accordance with embodiments of the invention.

A process to implement a distributed backwards sweep utilized in a gradient projection process to solve for optimal power flow is illustrated in FIG. 14A. The process 1400 includes a node receiving 1402 parameters from downstream neighbor nodes. The node calculates 1404 updated parameters with parameters received from downstream neighbor nodes. Updated parameters are sent 1406 to upstream neighbor nodes, in some embodiments, parameters can include (but are not limited to) voltage, power injection, current, resistance, and/or impedance. In many embodiments, backwards sweep begins at the leaf nodes and completes at the root node, but it should be readily appreciated that it may be performed over a subsection of nodes in a power distribution network as specific applications require.

A process to implement a distributed forwards sweep utilized in a gradient projection process to solve for optimal power flow is illustrated in FIG. 14B. The process 1450 includes a node receiving 1452 parameters from upstream neighbor nodes. The node calculates 1454 updated parameters using parameters from upstream neighbor nodes. Updated parameters are sent 1456 to downstream neighbor nodes, in some embodiments, parameters can include (but are not limited to) voltage, power injection, current, resistance, and/or impedance. In various embodiments, forwards sweep generally starts after a backwards sweep process is finished. In many embodiments, the forwards sweep begins at the root node and completes at the leaf nodes. However, it should be readily appreciated that it may be performed over a subsection of nodes in a power distribution network as specific applications require.

Although a variety of processes for performing backwards and forwards sweeps have been described above with respect to FIGS. 14A and 14B, any of a variety of distributed processes to propagate information throughout nodes in a power distribution network may be utilized as appropriate to the requirements of specific applications in accordance with embodiments of the invention.

Pseudocode that can be utilized to implement distributed gradient projection processes utilized in solving for optimal power flow executed by node controllers is illustrated in FIG. 15. The illustrated process 4 is similar to those outlined above with respect to FIG. 13. To summarize, the distributed gradient projection process is given in process 4, where $$\mathcal{L} := \{i \in \mathcal{N}^+ | \nexists j \text{ such that } i \to j\}$$

denotes the set of leaf nodes (buses). It includes three main steps:

S1 Backward sweep to compute g, h: for each node controller (agent) $i \in \mathcal{N}^+$, when all its downstream neighbors j have computed $g_j$, $h_j$, computes $g_i$, $h_i$, according to $$e_i = \frac{\mu}{v_i - \underline{v}_i} + \frac{\overline{\mu}}{v_i - \overline{v}_i} + \sum_{j:i \to j} e_j; \qquad (8)$$

$$f_i = \sum_{j:i \to j} \left( \frac{2r_{ij}\ell_{ij}}{v_i} + f_j \right),$$

S2 Forward sweep to compute c, d, e, f: for each node controller (agent) $h \in \mathcal{N}^+$, when all its upstream neighbors i have computed $c_i$, $d_i$, $e_i + 2r_{ij}P_{ij}/v_i$, $f_i + 2r_{ij}Q_{ij}/v_i$, computes $c_j$, $d_j$, $e_j$, $f_j$ as in (7).

S3 Compute $\partial_{(p,q)}L$: each node controller (agent) $i \in \mathcal{N}^+$ computes $\partial_{p_i}L$ and $\partial_{q_i}L$ according to (6).

Distributed Gradient Descent Processes

A distributed gradient decent process similar to process 3 in FIG. 11 can be implemented in a distributed manner by calling a distributed implementation of the inner loop for a sequence $\mu_1, \mu_2, \ldots, \mu_K$) of decreasing $\mu$. In various embodiments, a node controller and a coordinator controller can act in concert to achieve optimal power flow in a distributed manner utilizing a gradient decent process, which will be described further below with respect to the processes conceptually illustrated in FIG. 16 and FIG. 17. A distributed gradient decent process can also include a distributed line search process similar to line search process 2 illustrated in FIG. 10.

Figure 16:
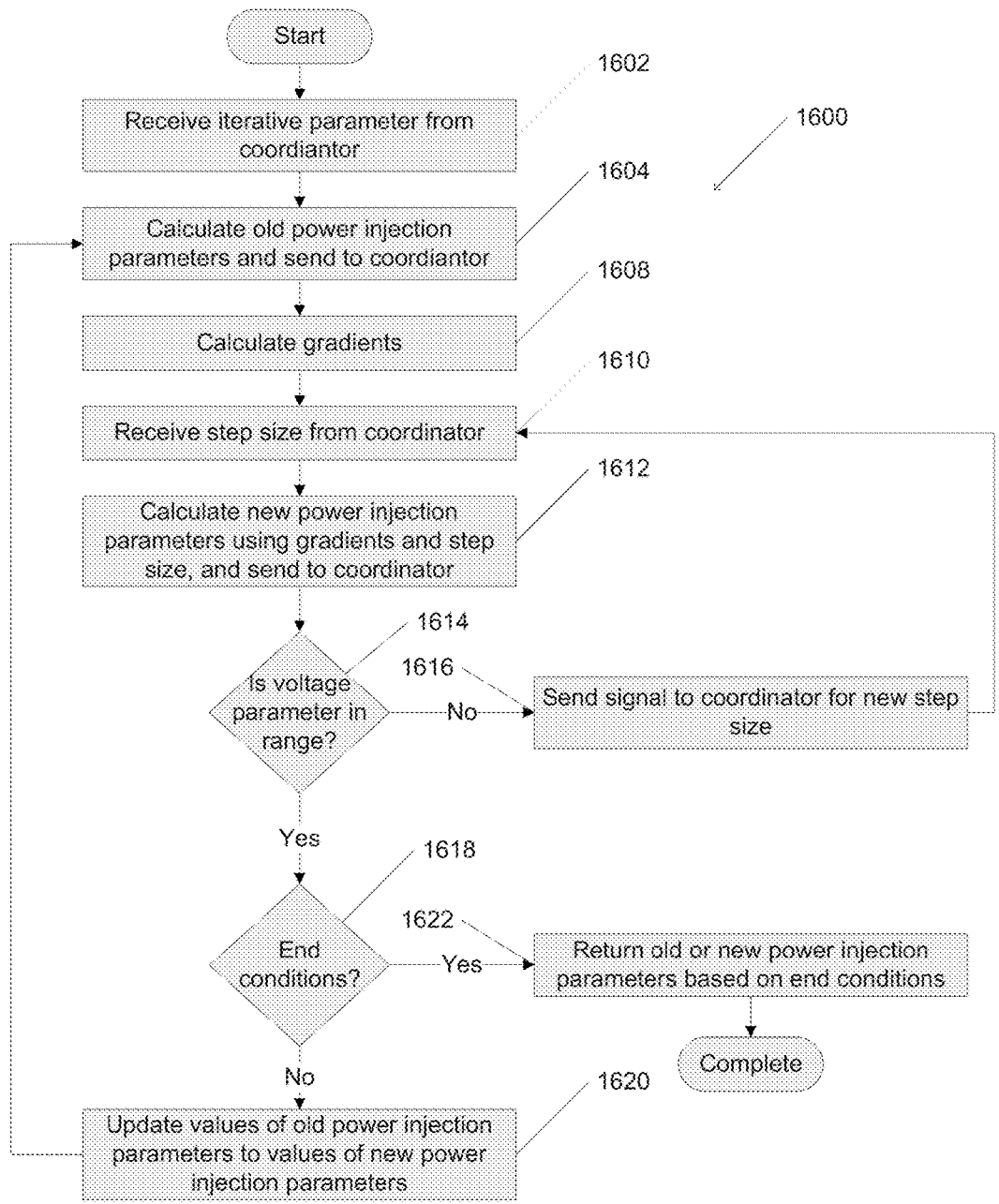
FIG. 16 is a flow chart illustrating a node controller implementing a distributed gradient descent process utilized in solving for optimal power flow in accordance with an embodiment of the invention.

A node controller implementing a distributed gradient descent process utilized in solving for optimal power flow is illustrated in FIG. 16. The process 1600 includes a node receiving 1602 an iterative parameter from the coordinator. In many embodiments, this iterative parameter can be a value from a decreasing sequence that approaches 0. The node calculates 1604 the old power injection parameters and sends them to the coordinator. The gradients are calculated 1608. A step size is received 1610 from the coordinator. New power injection parameters are calculated 1612 using information including gradients and step size, and the new power injection parameters are sent to the coordinator. The node checks if the voltage parameters are within a specified range 1612. If the voltage parameters are not within a specified range 1612, a signal is sent 1616 to the coordinator for a new step size. A new step size is received 1610 and the process repeats. If the voltage parameter is within a specified range 1612, end conditions 1618 are checked. If end conditions 1618 have not been met, the values of old power injection parameters are updated 1620 such that they now equal the values of the new power injection parameters. These parameters are used to calculate 1604 remaining old power injection parameters to be sent to the coordinator and the process repeats. If the end conditions 1618 have been met old or new power injection parameters are returned 1622 based on the end conditions and the process completes. It should readily be apparent that once complete, process 1600 will repeat again for additional iterative parameters until the system has (but is not limited to) solved for a local optimum of the optimal power flow problem, in several embodiments, a node controller similar to node controller 400 illustrated in FIG. 4 can implement this process.

Figure 17:
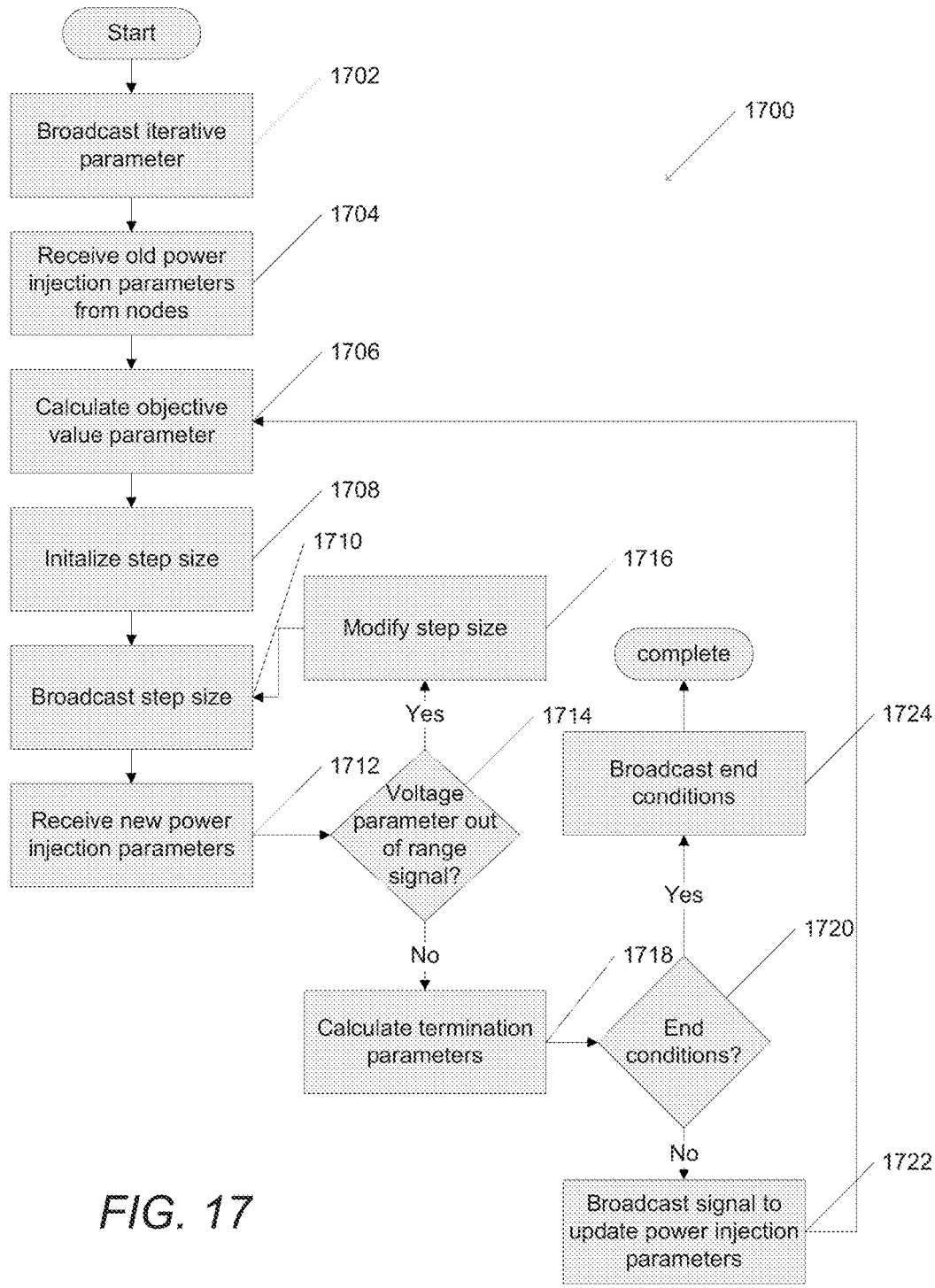
FIG. 17 is a flow chart illustrating a coordinator controller implementing a distributed gradient process utilized in solving for optimal power flow in accordance with an embodiment of the invention.

A a distributed gradient descent process utilized in solving for optimal power flow that can be implemented by a coordinator controller is illustrated in FIG. 17. The process 1700 includes broadcasting 1702 an iterative parameter to one or more nodes in the power distribution network. Old power injection parameters are received 1704 from one or more nodes. An objective value parameter is calculated 1706. A step size is initialized 1708 and broadcast 1710 to one or more nodes. New power injection parameters are received 1712 from one or more nodes. If a voltage parameter out of range signal 1714 is received from one or more nodes, the step size is modified 1716, the modified step size is broadcast 1710 and the process repeats. If a voltage parameter out of range signal 1714 is received from one or more nodes, termination parameters are calculated 1718. End conditions 1720 are checked. If end conditions 1720 are not met, a signal is broadcast 1722 to one or more nodes to update power injection parameters. If end conditions 1720 are met, end conditions are broadcast 1720 and the process completes. It should readily be apparent that once complete, process 1700 will repeat again for additional iterative parameters until the system has (but is not limited to) solved for a local optimum of the optimal power flow problem. In various embodiments, a coordinator controller similar to coordinator controller 300 illustrated in FIG. 3 can implement this process.

Figure 18:
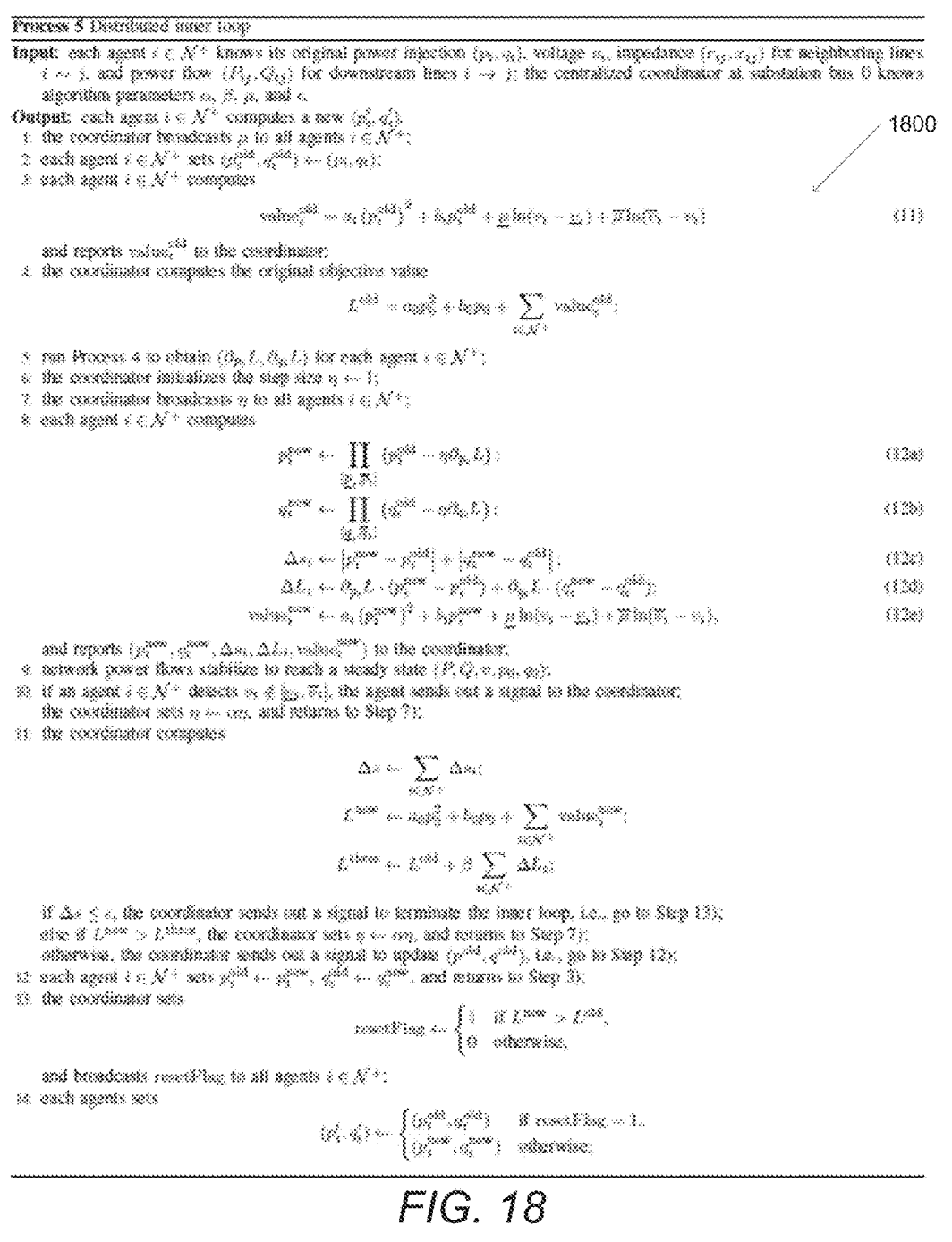

It should be appreciated that node controller process 1600 and coordinator process 1700 can run concurrently to solve for optimal power flow. Distributed gradient descent processes will be discussed further in detail below. Although a variety of distributed gradient descent processes have been described with respect to FIG. 16 and FIG. 17, a variety of processes can be utilized to implement distributed gradient descent on nodes and coordinator controllers in a power distribution network as appropriate to the requirements of specific applications in accordance with embodiments of the invention. Pseudocode that can be utilized to implement distributed gradient descent processes utilized in solving for optimal power flow is illustrated in FIG. 18. The illustrated process 5 is similar to those outlined above with respect to FIG. 16 and FIG. 17.

Distributed Line Searches

Line search processes similar to the line search process 2 illustrated in FIG. 10 can also be implemented in a distributed manner, which can give rise to a distributed implementation of the inner loop of process 3 illustrated in FIG. 11.

In process 5 illustrated in FIG. 18, each node controller (agent) $i \in \mathcal{N}^+$ keeps track of its last approved power injection ($p_i^{old}$, $q_i^{old}$) and proposes tentative power injections ($p_i^{new}$, $q_i^{new}$) to the coordinator; the coordinator decides whether to approve the tentative power injections.

Tentative power injection ($p^{new}$, $q^{new}$) is computed by gradient projection $$p_i^{new} \leftarrow \prod_{[\underline{p}_i, \overline{p}_i]} (p_i^{old} - \eta \partial_{p_i} L);$$

$$q_i^{new} \leftarrow \prod_{[\underline{q}_i, \overline{q}_i]} (q_i^{old} - \eta \partial_{q_i} L);$$

where the gradient is computed as in process 5 and the step size $\eta$ is controlled by the coordinator. The coordinator initializes $\eta=1$ and reduces $\eta$ by a fraction of $1-\alpha$ until voltage constraints are satisfied, i.e., $\underline{v}_i \leq v_i \leq \overline{v}_i$ for $i \in \mathcal{N}^+$, and the modified objective function is well-approximated by its linearization, i.e., $L^{new} < L^{thres}$.

The coordinator decides whether to approve the tentative power injection, i.e., set ($p^{old}$, $q^{old}$) ← ($p^{new}$, $q^{new}$), and when to terminate an inner loop, i.e., set ($p'$, $q'$). In other cases, the coordinator reduces the current to $\eta$ to $\alpha\eta$ ask for the submission of new tentative power injection ($p^{new}$, $q^{new}$).

The coordinator makes these decisions based on ($\Delta s_i$, $\Delta L_i$) computed by the node controllers (agents) $i \in \mathcal{N}^+$. The quantity $\Delta s_i$ captures the update size of ($p_i$, $q_i$), and $\Delta L_i$ is the product of gradient $\partial_{(p_i, q_i)} L$ and power injection update. In particular, if $\sum_{i \in \mathcal{N}} \Delta s_i \leq \varepsilon$, the coordinator decides to stop the inner loop; else if $L^{new} \leq L^{old} + \beta \sum_{i \in \mathcal{N}^+} L_i$, the coordinator decides to approve the tentative power injection, i.e., ($p^{old}$, $q^{old}$) ← ($p^{new}$, $q^{new}$); else the coordinator reduces the step size $\eta$ by a fraction of $1-\alpha$, i.e., $\eta \leftarrow \alpha\eta$.

Multiphase Networks

In various embodiments, gradient projection processes can also be applied to multiphase networks. Solving for OPF for multiphase networks using distributed gradient projection processes will be discussed further below.

In several embodiments, the objective function to minimize is $$L(x;\mu) = \sum_{\phi \in \Phi_0} a(p_0^\phi(x))^2 + bp_0^\phi(x) - \sum_{k=1}^n \sum_{\phi \in \Phi_k} (\underline{\mu} \ln(v_k^\phi - \underline{v}_k) + \overline{\mu} \ln(\overline{v}_k - v_k^\phi)).$$

Hence, to compute $\partial_x L$, it suffices to compute $\partial_x p_0^\phi$ and $\partial_x v_k^\phi$ for each $k \in \mathcal{N}^+$ and each $\phi \in \{a, b, c\}$.

$\partial_x p_0^\phi$ and $\partial_x v_k^\phi$ can be estimated for each $k$ and each $k \in \mathcal{N}^+$ and each $\phi \in \{a, b, c\}$ using the linearized power flow equations $$\sum_{i:i \to j} \Lambda_{ij} = s_j + \text{diag}(\text{Diag}(v_j) \gamma^{\Phi_j} y_j^H) + \sum_{k:j \to k} \Lambda_{jk}^{\Phi_j},$$

$j \in \mathcal{N}$;

$S_{ij} = \gamma^{\Phi_{ij}} \text{Diag}(\Lambda_{ij}), i \to j;$ $v_j = v_i^{\Phi_{ij}} - \text{diag}(S_{ij} z_{ij}^H + z_{ij} S_{ij}^H), i \to j$ where $\alpha = e^{-2\pi/3},$ $\beta = \begin{bmatrix} 1 \\ \alpha \\ \alpha^2 \end{bmatrix},$ $\gamma = \beta \beta^H.$ The above equations can be written in scalar format to obtain $$\sum_{i:i \to j} \Lambda_{ij}^\phi = s_j^\phi + \sum_{k:j \to k} \Lambda_{jk}^\phi + v_j^\phi \sum_{\varphi \in \Phi_j} \alpha^{\phi-\varphi} \overline{y}_j^{\phi\varphi}, \quad (10a)$$

$j \in \mathcal{N}, \phi \in \Phi_j;$ $$v_j^\phi = v_i^\phi - \sum_{\varphi \in \Phi_j} (\Lambda_{ij}^\varphi \alpha^{\phi-\varphi} \overline{z}_{ij}^{\phi\varphi} + \overline{\Lambda}_{ij}^{-\varphi} \alpha^{\varphi-\phi} z_{ij}^{\phi\varphi}), \quad (10b)$$

$i \to j, \phi \in \Phi_{ij}.$

Additionally, $\partial_x(\Lambda_{ij}^\phi, v_i^\phi)$ can be estimated in two rounds as follows. In the first round, the $V_j^\phi$ . . . term can be ignored in (10a) to obtain $$\partial_{p_i^\phi} \Lambda_{kl}^\varphi = \mathbb{1}_{\phi=\varphi} \mathbb{1}_{i \in Down(l)}, \partial_{q_i^\varphi} \Lambda_{kl}^\phi = i \mathbb{1}_{\phi=\varphi} \mathbb{1}_{i \in Down(l)}.$$

This expression can be used to obtain the estimates of $\partial_x v_k^\phi$ as $$\partial_x v_k^\phi = \partial_x v_j^\phi - \sum_{\varphi \in \Phi_k} (\partial_x \Lambda_{jk}^\varphi \alpha^{\phi-\varphi} \overline{z}_{jk}^{\phi\varphi} + \partial_x \overline{\Lambda}_{jk}^\varphi \alpha^{\varphi-\phi} z_{jk}^{\phi\varphi})$$

$$= -\sum_{(i,j) \in \mathcal{P}_k} \sum_{\varphi \in \Phi_j} (\partial_x \Lambda_{ij}^\varphi \alpha^{\phi-\varphi} \overline{z}_{ij}^{\phi\varphi} + \partial_x \overline{\Lambda}_{ij}^\varphi \alpha^{\varphi-\phi} z_{ij}^{\phi\varphi})$$

which simplifies to $$\partial_{p_i^\varphi} v_k^\phi = -2 \sum_{(s,t) \in \mathcal{P}_{k \wedge i}} \text{Re}(\alpha^{\phi-\varphi} \overline{z}_{st}^{\phi\varphi}), \quad (11a)$$

$$\partial_{q_i^\varphi} v_k^\phi = 2 \sum_{(s,t) \in \mathcal{P}_{k \wedge i}} \text{Im}(\alpha^{\phi-\varphi} \overline{z}_{st}^{\phi\varphi}) \quad (11b)$$

for $k \in \mathcal{N}^+$, $\phi \in \Phi_k$, and $x = p_i^\varphi$ or $q_i^\varphi$ for $i \in \mathcal{N}^+$ and $\varphi \in \Phi_i$. At last, we estimate $\partial_x \Lambda_{kl}^\phi$ as $$\partial_x \Lambda_{kl}^\phi = \partial_x s_l^\phi + \sum_{m:l\to m} \partial_x \Lambda_{lm}^\phi + \partial_x v_l^\phi \sum_{\varphi\in\Phi_l} \alpha^{\phi-\varphi} \overline{y}_l^{\phi\varphi} \quad (12)$$

$$= \sum_{t\in Down(l)} \left[ \partial_x s_t^\phi + \partial_x v_t^\phi \sum_{\xi\in\Phi_t} \alpha^{\phi-\xi} \overline{y}_t^{\phi\xi} \right],$$

$k \to l, \phi \in \Phi_l$.

This can be used to obtain $$\partial_{p_i^\varphi} p_0^\phi = \mathbb{1}_{\phi=\varphi} + \sum_{t=1}^n \partial_{p_i^\varphi} v_t^\phi \mathrm{Re}\left( \sum_{\xi\in\Phi_t} \alpha^{\phi-\xi} \overline{y}_t^{\phi\xi} \right),$$

$$\partial_{q_i^\varphi} p_0^\phi = \sum_{t=1}^n \partial_{q_i^\varphi} \mathrm{Re}\left( \sum_{\xi\in\Phi_t} \alpha^{\phi-\xi} \overline{y}_t^{\phi\xi} \right)$$

for $\phi \in \Phi_0$, $i \in \mathcal{N}^+$, and $\varphi \in \Phi_i$.

Furthermore, the gradient $\partial_x L$ can be estimated as follows:

$$\partial_{p_i^\varphi} L = \sum_{\phi\in\Phi_0} (2ap_0^\phi + b)\partial_{p_i^\varphi} p_0^\phi - \sum_{k=1}^n \sum_{\phi\in\Phi_k} \left[ \frac{\mu}{v_k^\phi - \underline{v}_k} - \frac{\overline{\mu}}{\overline{v}_k - v_k^\phi} \right] \partial_{p_i^\varphi} v_k^\phi$$

$$= \sum_{\phi\in\Phi_0} (2ap_0^\phi + b)\left[ \mathbb{1}_{\phi=\varphi} + \sum_{k=1}^n \partial_{p_i^\varphi} v_k^\phi \mathrm{Re}\left( \sum_{\xi\in\Phi_k} \alpha^{\phi-\xi} \overline{y}_k^{\phi\xi} \right) \right] -$$

$$\sum_{k=1}^n \sum_{\phi\in\Phi_k} \left[ \frac{\mu}{v_k^\phi - \underline{v}_k} - \frac{\overline{\mu}}{\overline{v}_k - v_k^\phi} \right] \partial_{p_i^\varphi} v_k^\phi$$

$$= 2ap_0^\varphi + b + \sum_{k=1}^n \sum_{\phi\in\Phi_k} \left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right] \partial_{p_i^\varphi} v_k^\phi$$

$$= 2ap_0^\varphi + b - 2\sum_{k=1}^n \sum_{\phi\in\Phi_k} \left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right] \sum_{(s,t)\in\mathcal{P}_{k\wedge i}} \mathrm{Re}(\alpha^{\phi-\varphi} \overline{z}_{st}^{\phi\varphi})$$

$$= 2ap_0^\varphi + b - 2\sum_{(s,t)\in\mathcal{P}_i} \sum_{\phi\in\Phi_t} \mathrm{Re}(\alpha^{\phi-\varphi} \overline{z}_{st}^{\phi\varphi}) \sum_{k\in Down(t)}$$

$$\left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right]$$

-continued and $$\partial_{q_i^\varphi} L = \sum_{\phi\in\Phi_0} (2ap_0^\phi + b)\partial_{q_i^\varphi} p_0^\phi - \sum_{k=1}^n \sum_{\phi\in\Phi_k} \left[ \frac{\mu}{v_k^\phi - \underline{v}_k} - \frac{\overline{\mu}}{\overline{v}_k - v_k^\phi} \right] \partial_{q_i^\varphi} v_k^\phi$$

$$= \sum_{\phi\in\Phi_0} (2ap_0^\phi + b)\sum_{k=1}^n \partial_{q_i^\varphi} v_k^\phi \mathrm{Re}\left( \sum_{\xi\in\Phi_k} \alpha^{\phi-\xi} \overline{y}_k^{\phi\xi} \right) -$$

$$\sum_{k=1}^n \sum_{\phi\in\Phi_k} \left[ \frac{\mu}{v_k^\phi - \underline{v}_k} - \frac{\overline{\mu}}{\overline{v}_k - v_k^\phi} \right] \partial_{q_i^\varphi} v_k^\phi$$

$$= \sum_{k=1}^n \sum_{\phi\in\Phi_k} \left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right] \partial_{q_i^\varphi} v_k^\phi$$

$$= 2\sum_{k=1}^n \sum_{\phi\in\Phi_k} \left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right] \sum_{(s,t)\in\mathcal{P}_{k\wedge i}} \mathrm{Im}(\alpha^{\phi-\varphi} \overline{z}_{st}^{\phi\varphi})$$

$$= 2\sum_{(s,t)\in\mathcal{P}_i} \sum_{\phi\in\Phi_t} \mathrm{Im}(\alpha^{\phi-\varphi} \overline{z}_{st}^{\phi\varphi}) \sum_{k\in Down(t)}$$

$$\left[ (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi} \right]$$

for $i \in \mathcal{N}^+$ and $\varphi \in \Phi_i$.

In many embodiments, $g_k^\phi$ can be defined as $$g_k^\phi := (2ap_0^\phi + b)\mathrm{Re}\left( \sum_{\xi\in\Phi_k} \alpha^{\phi-\xi} \overline{y}_k^{\phi\xi} \right) - \frac{\mu}{v_k^\phi - \underline{v}_k} + \frac{\overline{\mu}}{\overline{v}_k - v_k^\phi}$$

for $k \in \mathcal{N}^+$ and $\phi \in \Phi_k$, then $$\partial_{p_i^\varphi} L = 2ap_0^\varphi + b - 2\sum_{(s,t)\in\mathcal{P}_i} \sum_{\phi\in\Phi_t} \mathrm{Re}(\alpha^{\phi-\varphi} \overline{z}_{st}^{\phi\varphi}) \sum_{k\in Down(t)} g_k^\phi,$$

$$\partial_{q_i^\varphi} L = 2\sum_{(s,t)\in\mathcal{P}_i} \sum_{\phi\in\Phi_t} \mathrm{Im}(\alpha^{\phi-\varphi} \overline{z}_{st}^{\phi\varphi}) \sum_{k\in Down(t)} g_k^\phi$$

for $i \in \mathcal{N}^+$ and $\varphi \in \Phi_i$.

$g_k$ can be written in a more compact form:

$$g_k = Re[\text{Diag}(\bar{\beta}^{\Phi_k}) \cdot y_k \cdot \beta^{\Phi_k}] \oslash [2ap_0+b] - \underline{\mu} \oslash (v-\underline{v}) + \bar{\mu} \oslash (\bar{v}-v)$$

for $k \in \mathcal{N}^+$, where $\otimes$ denotes pair-wise multiplication, and $\oslash$ denotes component-wise division, i.e., for a, $b \in \mathbb{R}^n$ and $c \in \mathbb{R}$, $$(a \otimes b)_k = a_k \cdot b_k, (c \oslash a)_k = c/a_k, k=1,2,\ldots,n.$$

Then, to compute $\partial_{p_i} L$ and $\partial_{q_i} L$, first do a backward sweep to compute $\text{sumDown}_k$ and then do a forward sweep to compute $\text{sumUp}_i$, more explicitly as follows:

$$\text{sumDown}_t = \sum_{k \in \text{Down}(t)} g_k^{\Phi_t},$$

$t \in \mathcal{N}^+$;

$$h_{(s,t)} = \text{Diag}(\beta^{-\Phi_{st}}) \cdot z_{st}^H \cdot \text{Diag}(\beta^{\Phi_{st}}) \cdot \text{sumDown}_t,$$

$s \to t$;

$$\text{sumUp}_i = \sum_{(s,t) \in \Phi_i} h_{(s,t)}^{\Phi_i},$$

$i \in \mathcal{N}^+$.

The backward-forward procedure woks as $$\text{sumDown}_t = g_t + \sum_{u:t \to u} \text{sumDown}_u^{\Phi_t},$$

$t \in \mathcal{N}^+$;

$$\text{sumUp}_i = \text{sumUp}_h^{\Phi_i} + h_{(h,i)},$$

$h \to i$.

At last, the expressions for $\partial_{p_i} L$ and $\partial_{q_i} L$ is as follows:

$$\partial_{p_i} L = 2ap_0^{\Phi_i} + b - 2Re(\text{sumUp}_i),$$

$$\partial_{q_i} L = 2Im(\text{sumUp}_i)$$

for $i \in \mathcal{N}^+$.

Simulated Numerical Results

The accuracy and efficiency of a process similar to process 3 illustrated in FIG. 11 can be evaluated for a number of simulated balanced networks. In particular, the convex relaxation approach can be used to obtain the global optimal value of (1). The amount the objective value obtained by process 3 deviates from the global optimal value can be checked. The convex relaxation is solved by CVX, a convex relaxation approach, and its execution time is used as a benchmark to investigate the simulated efficiency of process 3. All simulations use Matlab 7.9.0.529 (64-bit) with toolbox cvx 1.21 on Mac OS X 103.5 with 2.66 GHz Intel Core 2 Due CPU and 4 GB 1067 MHz DDR3 memory.

Simulated Test Networks

Figure 19A:
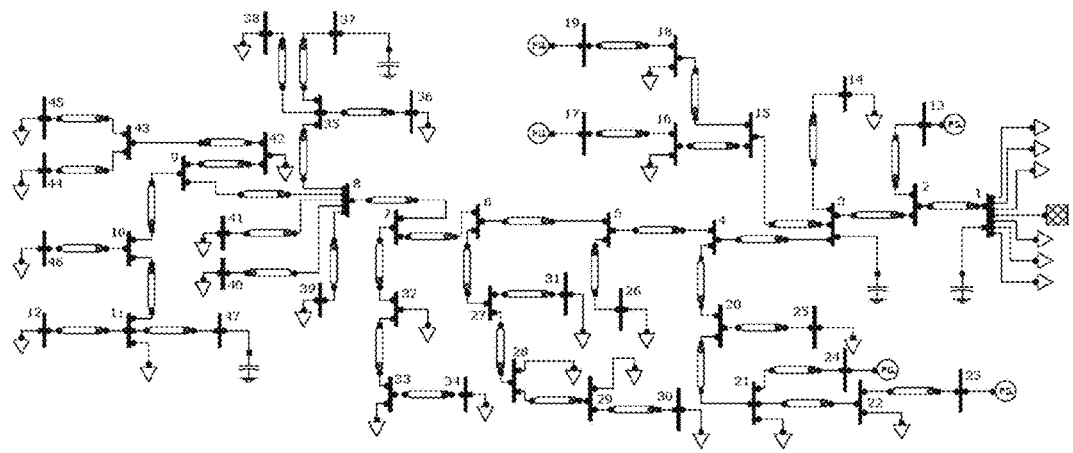
FIGS. 19A-19B are diagrams conceptually illustrating a 47-node (47-bus) network and a 56-node (56-bus) network respectively.
Figure 19B:
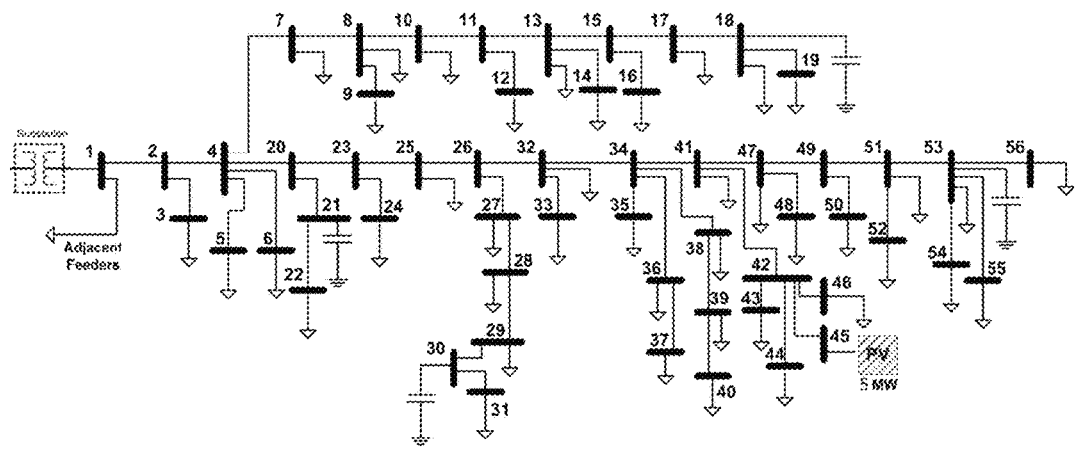
Figure 20:
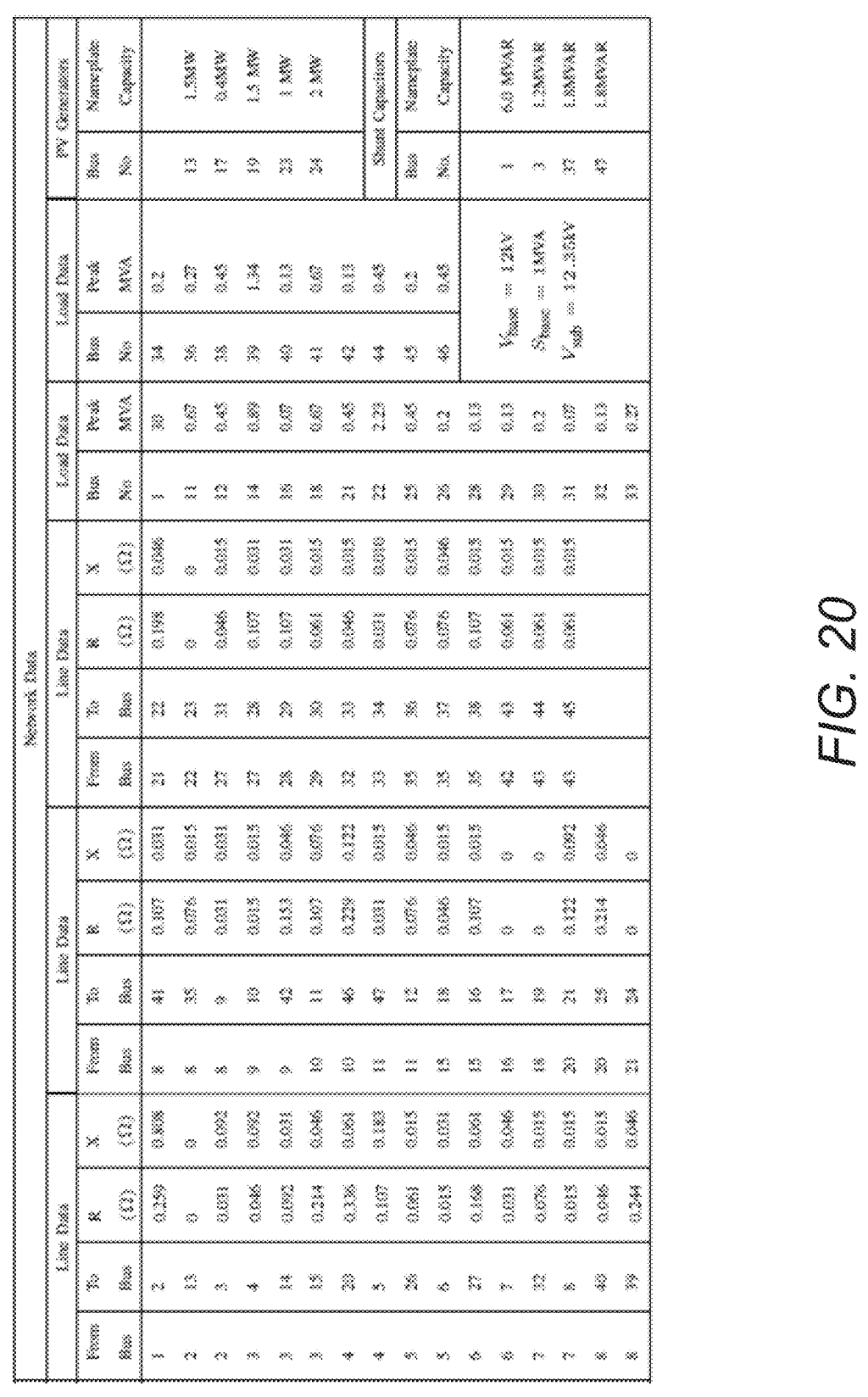
Figure 21:
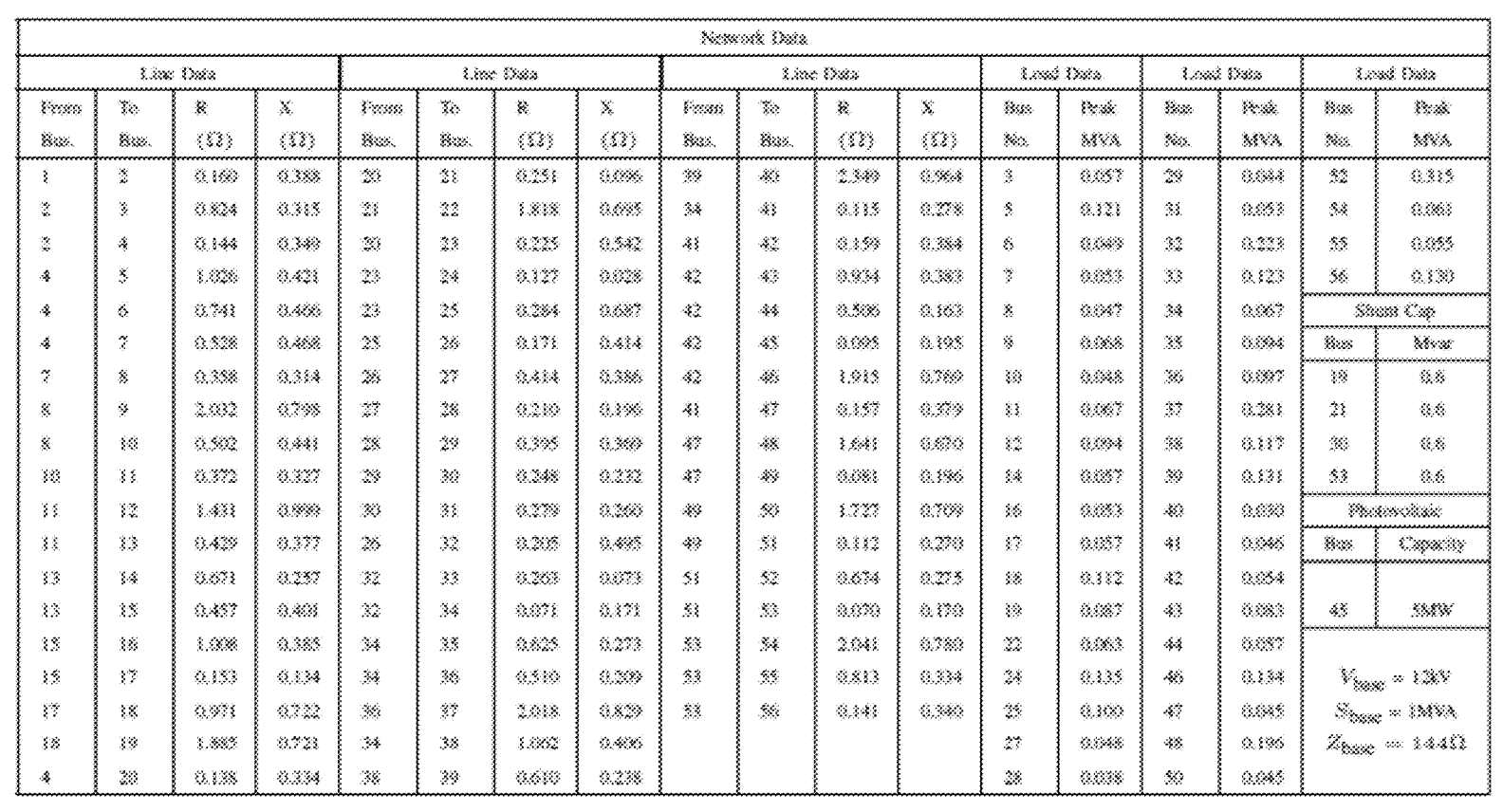

The simulated test networks include a 47-node (47-bus), a 56-node (56-bus) network, and subnetworks of a 2065-node (2065-bus) network. These networks are all in the service territory of Southern California Edison (SCE), a utility company in California, USA. Topologies of the 47-node (47-bus) network and the 56-node (56-bus) network are illustrated in FIGS. 19A and 19B respectively. Table I illustrated in FIG. 20 shows parameters of a simulated 47-node (47-bus) network including line impedances, peak spot load, and nameplate ratings of capacitors and PV generators. Table II illustrated in FIG. 21 shows parameters of a simulated 56-node (56-bus) network including Line impedances, peak spot load, and nameplate ratings of capacitors and PV generators.

Simulated OPF Setup

The following OPF setup is used throughout this section.
1. The objective is to minimize power loss in the network,
2. The power injection constraints are as follows. For each node (bus) $i \in \mathcal{N}$, there may be multiple devices including loads, capacitors, and PV panels. Assume that there is a total of $D_i$ such devices and label them by 1, 2, ..., $D_i$. Let $s_{i,d} = p_{i,d} + iq_{i,d}$ denote the power injection of device d for d=1, 2, ..., $D_i$. If device d is a load with given real and reactive power consumptions p and q, then we impose $$s_{i,d} = -p - iq. \quad (13)$$

If device d is a load with given peak apparent power $s_{peak}$, then we impose $$s_{i,d} = -s_{peak} \exp(j\theta) \quad (14)$$

where $\theta = \cos^{-1}(0.9)$, i.e, power injection $s_{i,d}$ is considered to be a constant, obtained by assuming a power factor of 0.9 at peak apparent power. If device d is a capacitor with nameplate $\bar{q}$, then we impose $$Re(s_{i,d}) = 0 \text{ and } 0 \leq Im(s_{i,d}) \leq \bar{q}. \quad (15)$$

If device d is a PV panel with nameplate $\bar{s}$ and real power generation $p_i$, then we impose $$Re(s_{i,d}) = p_i \text{ and } |s_{i,d}| \leq \bar{s}. \quad (16)$$

The power injection at node (bus) i is $$s_i = \sum_{d=1}^{D_i} s_{i,d}$$

where $s_{i,d}$ satisfies one of (13)-(16).
3. The voltage regulation constraint is considered to be $0.95^2 \leq v_i \leq 1.05^2$ for $i \in \mathcal{N}^+$.

Simulated Results

Numerical results are summarized in Table III illustrated in FIG. 22. Table III shows objective values and CPU times of CVX and IPM. It can be seen that process 3 obtains 70× speed up over the CVX/sedumi approach, at the cost of around 2e-7 suboptimality ratio for large-scale networks. Note that process 3 is run in series rather than parallel due to the limitation of platform on which the simulation was performed. The speed up can be even more significant when parallel implementation is utilized.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:
1. A node controller comprising:
a network interface:
a processor;
a memory containing:
a node controller application;
a plurality of node operating parameters describing operating parameters of a node; and
a plurality of node operating parameters describing operating parameters for a set of at least one connected node selected from a group consisting of at least one downstream node and at least one upstream node, where the node is connected to the set of at least one connected node in a power distribution network;

wherein the processor is directed by the node controller application to:

receive a plurality of coordinator parameters describing operating parameters of a node coordinator by the network interface;

calculate a plurality of updated node operating parameters of the node using an iterative gradient projection process using the plurality of node operating parameters describing operating parameters of the node and the plurality of node operating parameters describing operating parameters for the set of at least one connected node, wherein:

the iterative gradient projection process comprises a backwards sweep process comprising:

receiving operating parameters from the one or more downstream nodes;

calculating a plurality of updated node operating parameters using the operating parameters from the one or more downstream nodes; and sending the plurality of updated node operating parameters to the one or more upstream nodes;

each iteration in the iterative process is determined by the coordinator parameters; and the node operating parameters comprise power injection parameters calculated based on the operating parameters, the plurality of node operating parameters, and the coordinator parameters; and adjust a power flow in the power distribution network by controlling the plurality of node operating parameters describing operating parameters of the node based on the plurality of updated node operating parameters of the node when the power injection parameters are within a specified range.

2. The node controller of claim 1, wherein the iterative gradient projection process is a distributed process.

3. The node controller of claim 1, wherein the iterative gradient projection process further comprises calculating gradient parameters.

4. The node controller of claim 1, wherein the iterative gradient projection process further comprises calculating a gradient step size.

5. The node controller of claim 1, wherein the iterative gradient projection process further comprises a forward sweep process.

6. A node controller comprising:
a network interface;
a processor;
a memory containing:
a node controller application,
a plurality of node operating parameters describing operating parameters of a node; and
a plurality of node operating parameters describing operating parameters for a set of at least one connected node selected from a group consisting of at least one downstream node and at least one upstream node, where the node is connected to the set of at least one connected node in a power distribution network;

wherein the processor is directed by the node controller application to:

receive a plurality of coordinator parameters describing operating parameters of a node coordinator by the network interface;

calculate a plurality of updated node operating parameters of the node using an iterative gradient projection process using the plurality of node operating parameters describing operating parameters of the node and the plurality of node operating parameters describing operating parameters for the set of at least one connected node, wherein:

the iterative gradient projection process comprises a forward sweep process comprising:

receiving operating parameters from the one or more upstream nodes;

calculating a plurality of updated node operating parameters using the operating parameters from the one or more upstream nodes; and sending the plurality of updated node operating parameters to the one or more downstream nodes;

each iteration in the iterative process is determined by the coordinator parameters; and the node operating parameters comprise power injection parameters calculated based on the operating parameters, the plurality of node operating parameters and the coordinator parameters; and adjust a power flow in the power distribution network by controlling the plurality of node operating parameters describing operating parameters of the node based on the plurality of updated node operating parameters of the node when the power injection parameters are within a specified range.

7. The node controller of claim 3, wherein calculating gradient parameters further comprises exact calculation of the gradient parameters.

8. The node controller of claim 3, wherein calculating gradient parameters further comprises an approximation of the gradient parameters.

9. The node controller of claim 3, wherein calculating gradient parameters is a distributed process.

10. The node controller of claim 4, wherein calculating a gradient step size is evaluated using a line search.

11. The node controller of claim 1, wherein the node is part of a radial network topology.

12. The node controller of claim 1, wherein node operating parameters include power injection, current, and impedance.

13. The node controller of claim 1, wherein the node is configured to control operating parameters as components in a single phase power distribution network.

14. The node controller of claim 1, wherein the node is configured to control operating parameters as components in a multiphase balanced power distribution network.

15. The node controller of claim 1, wherein the node is configured to control operating parameters as components in a multiphase unbalanced power distribution network.

* * * * *